United States Patent [19]
Katakura et al.

[11] Patent Number: 5,892,532
[45] Date of Patent: Apr. 6, 1999

[54] NON-IMPACT PRINTER AND A PRINT HEAD THEREOF

[75] Inventors: Shinichi Katakura; Koji Ida; Akira Nagumo; Katsuyuki Ito; Koichi Negishi, all of Tokyo, Japan

[73] Assignee: Oki Electric Industry Co., Ltd., Tokyo, Japan

[21] Appl. No.: 889,706

[22] Filed: Jul. 8, 1997

Related U.S. Application Data

[63] Continuation-in-part of Ser. No. 498,731, Jul. 6, 1995.

[30]  Foreign Application Priority Data

Jul. 8, 1994 [JP] Japan .................................. 6-156906
May 19, 1995 [JP] Japan .................................. 7-121187

[51] Int. Cl.$^6$ ................................ B41J 2/47; B41J 2/435
[52] U.S. Cl. .......................................... 347/240; 347/237
[58] Field of Search ................................... 347/240, 236, 347/237, 238

[56]  References Cited

U.S. PATENT DOCUMENTS

| | | | |
|---|---|---|---|
| 4,499,459 | 2/1985 | Sasaki et al. ............................. | 345/55 |
| 4,689,694 | 8/1987 | Yoshida ..................................... | 347/13 |
| 4,982,203 | 1/1991 | Uebbing et al. .......................... | 347/240 |
| 5,138,310 | 8/1992 | Hirane et al. ............................. | 347/237 |
| 5,253,934 | 10/1993 | Potucek et al. .......................... | 347/240 |
| 5,640,190 | 6/1997 | Bollansee et al. ....................... | 347/240 |

FOREIGN PATENT DOCUMENTS 63-33056  2/1988  Japan .

*Primary Examiner*—N. Le
*Assistant Examiner*—Thinh Nguyen
*Attorney, Agent, or Firm*—Panitch Schwarze Jacobs & Nadel, P.C.

[57]  ABSTRACT

A print head for non-impact printer is, for example, an LED head which comprises a plurality of light-emitting elements, LED drivers for selectively causing a drive current to flow into the light-emitting elements on the basis of the print data, a non-volatile memory for storing the modification data related to the value of the drive current. The modification data are determined in advance at the manufacturing process on the basis of the measured result when the light-emitting elements were driven by the LED driver so that all the light-emitting elements emit substantially same amount of light at the printing operation.

11 Claims, 24 Drawing Sheets

FIG. 21

| ADDRESS | SECOND MODE | FIRST MODE |
|---|---|---|
| | VACANT | VACANT |
| 2599 | REFERENCE CURRENT OF $DR_1$ | INSTRUCTION VALUE OF $LD_1$ |
| 2598 | INSTRUCTION VALUE OF $LD_1$ | INSTRUCTION VALUE OF $LD_2$ |
| ⋮ | | |
| 2535 | INSTRUCTION VALUE OF $LD_{64}$ | INSTRUCTION VALUE OF $LD_{65}$ |
| 2534 | REFERENCE CURRENT OF $DR_2$ | INSTRUCTION VALUE OF $LD_{66}$ |
| 2533 | INSTRUCTION VALUE OF $LD_{65}$ | INSTRUCTION VALUE OF $LD_{67}$ |
| ⋮ | | |
| 40 | INSTRUCTION VALUE OF $LD_{2520}$ | INSTRUCTION VALUE OF $LD_{2560}$ |
| ⋮ | | VACANT |
| 0 | INSTRUCTION VALUE OF $LD_{2560}$ | |

NON-IMPACT PRINTER AND A PRINT HEAD THEREOF

CROSS-REFERENCE TO RELATED APPLICATIONS

This is a continuation-in-part of U.S. patent application Ser. No. 08/498,731, filed Jul. 6, 1995.

BACKGROUND OF THE INVENTION

The present invention relates to a non-impact printer and a print head for non-impact printer such as a LED head for electrophotographic printer and a thermal head.

FIG. 1 is a block diagram showing a conventional LED head 10 which comprises a plurality of light-emitting elements $LD_1$–$LD_{2560}$ (only $LD_1$–$LD_4$ are shown in FIG. 1) capable of printing at 300 dots per inch (DPI). $SR_1$–$SR_{2560}$ (only $SR_1$–$SR_4$ are shown in FIG. 1) are shift registers for sequentially shifting bit data signal DATA in synchronization with a clock signal CLK. $LT_1$–$LT_{2560}$ (only $LT_1$–$LT_4$ are shown in FIG. 1) are latches for latching the bit data signal DATA when the latch signal LOAD is inputted. $G_1$–$G_{2560}$ (only $G_1$–$G_4$ are shown in FIG. 1) are gate elements, $Tr_1$–$Tr_{2560}$ (only $Tr_1$–$Tr_4$ are shown in FIG. 1) are transistors as switching elements, $r_1$–$r_{2560}$ (only $r_1$–$r_4$ are shown in FIG. 1) are protective resistors, and $V_D$ is a power supply line. When high level signals from the latches $LT_1$–$LT_{2560}$ are applied to the gate elements $G_1$–$G_{2560}$ and the low level drive signal STB is inputted to the gate elements $G_1$–$G_{2560}$ for executing printing, high level inputs are applied to the bases of the switching elements $Tr_1$–$Tr_{2560}$. At this time, the switching elements $Tr_1$–$Tr_{2560}$ turn to the on state, a drive current flows in the light-emitting elements $LD_1$–$LD_{2560}$, and then the light-emitting elements $LD_1$–$LD_{2560}$ emit light.

However, there are variations in the individual characteristics of the light-emitting elements $LD_1$–$LD_{2560}$ and the switching elements $Tr_1$–$Tr_{2560}$. Consequently, as indicated at the lower side of FIG. 2, the individual light intensity $E_1$–$E_{2560}$ (only $E_1$–$E_6$ are shown in FIG. 2) of the light-emitting elements $LD_1$–$LD_{2560}$ are different and as indicated at the upper side of FIG. 2, the sizes of the printed dots $d_1$–$d_{2560}$ (only $d_1$–$d_6$ are shown in FIG. 2) are not uniform, thereby resulting in deterioration of printing quality.

SUMMARY OF THE INVENTION

An object of the present invention is to provide a print head for non-impact printer wherein individual variations in energy emitted from the printing elements can be reduced, and high printing quality can be obtained.

According to the present invention, a print head for non-impact printer comprises a plurality of printing elements for conducting a printing operation; and a driver for selectively causing a drive energy to flow into the printing elements on the basis of print data inputted thereto; a memory for storing modification data related to the value of the drive energy. The modification data are determined in advance on the basis of measured result when the printing elements were driven by the driver so that all the printing elements emit substantially same amount of energy at the printing operation. The print head also comprises an energy changer for changing values of the drive energy supplied to each of the printing elements on the basis of the modification data supplied from the memory; and a transmitter section for transmitting the modification data stored in the memory to the energy changer prior to the printing operation. The print head may be an LED head, a plasma display panel head or a thermal head.

Also, according to the present invention, a non-impact printer comprises a plurality of printing elements for conducting a printing operation; and a driver for selectively causing a drive energy to flow into the printing elements on the basis of print data inputted thereto; a memory for storing modification data related to the value of the drive energy. The modification data are determined in advance on the basis of measured result when the printing elements were driven by the driver so that all the printing elements emit substantially same amount of energy at the printing operation. The print head also comprises an energy changer for changing values of the drive energy supplied to each of the printing elements on the basis of the modification data supplied from the memory; and a transmitter for transmitting the modification data stored in the memory to the energy changer prior to the printing operation.

BRIEF DESCRIPTION OF THE DRAWINGS

FIG. 21 is an explanatory diagram for explaining the modification data stored in the memory area of the non-volatile memory according to a fourth embodiment of the present invention;

DETAILED DESCRIPTION OF THE INVENTION

FIRST EMBODIMENT

Figure 1:
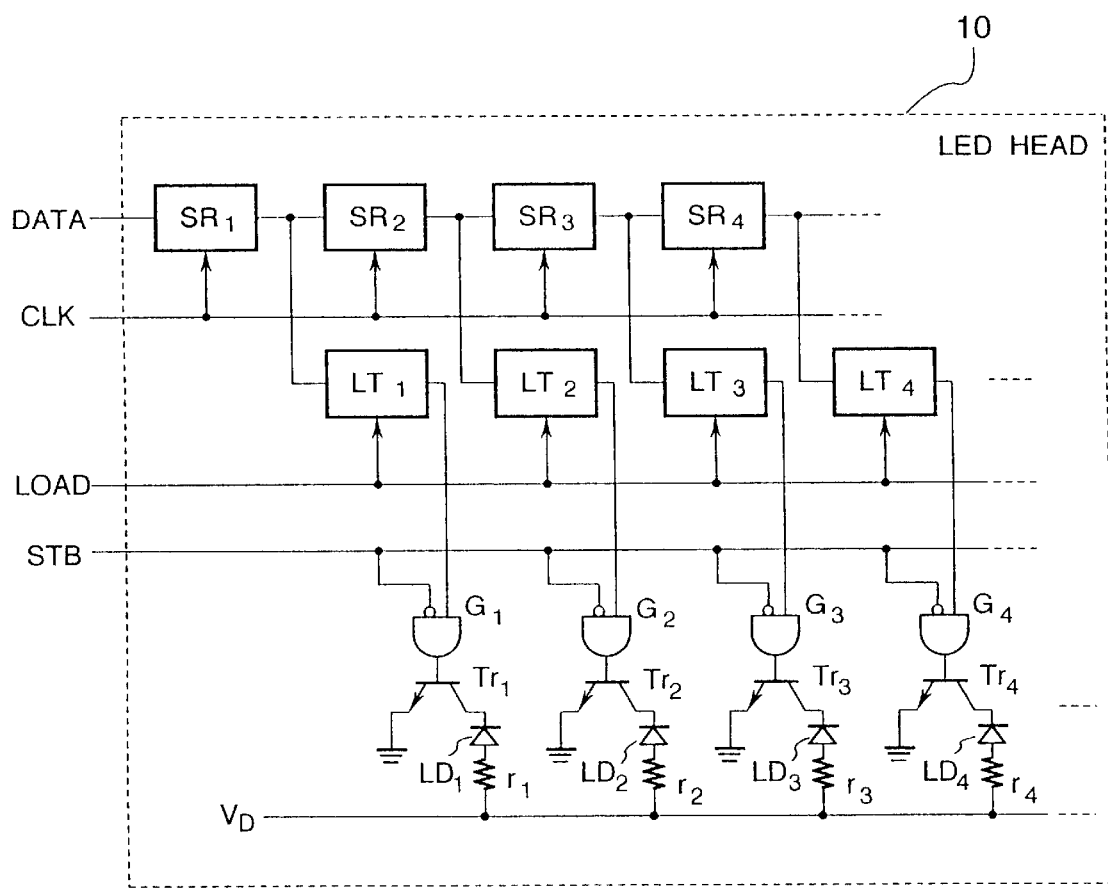
FIG. 1 is a block diagram showing a conventional LED head.
Figure 2:
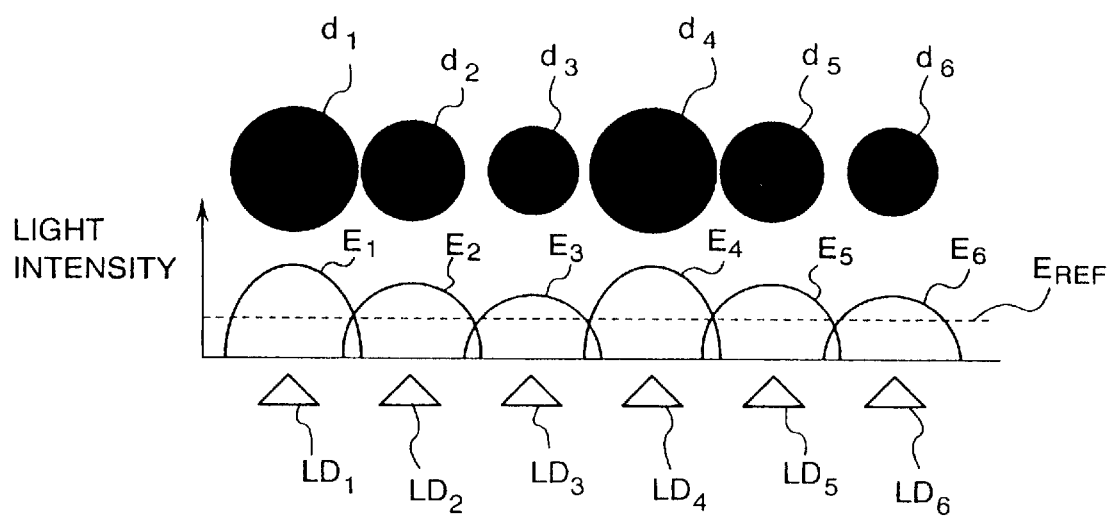
FIG. 2 shows light intensity of the light-emitting elements of FIG. 1 and printed dots formed by the light-emitting elements.
Figure 3:
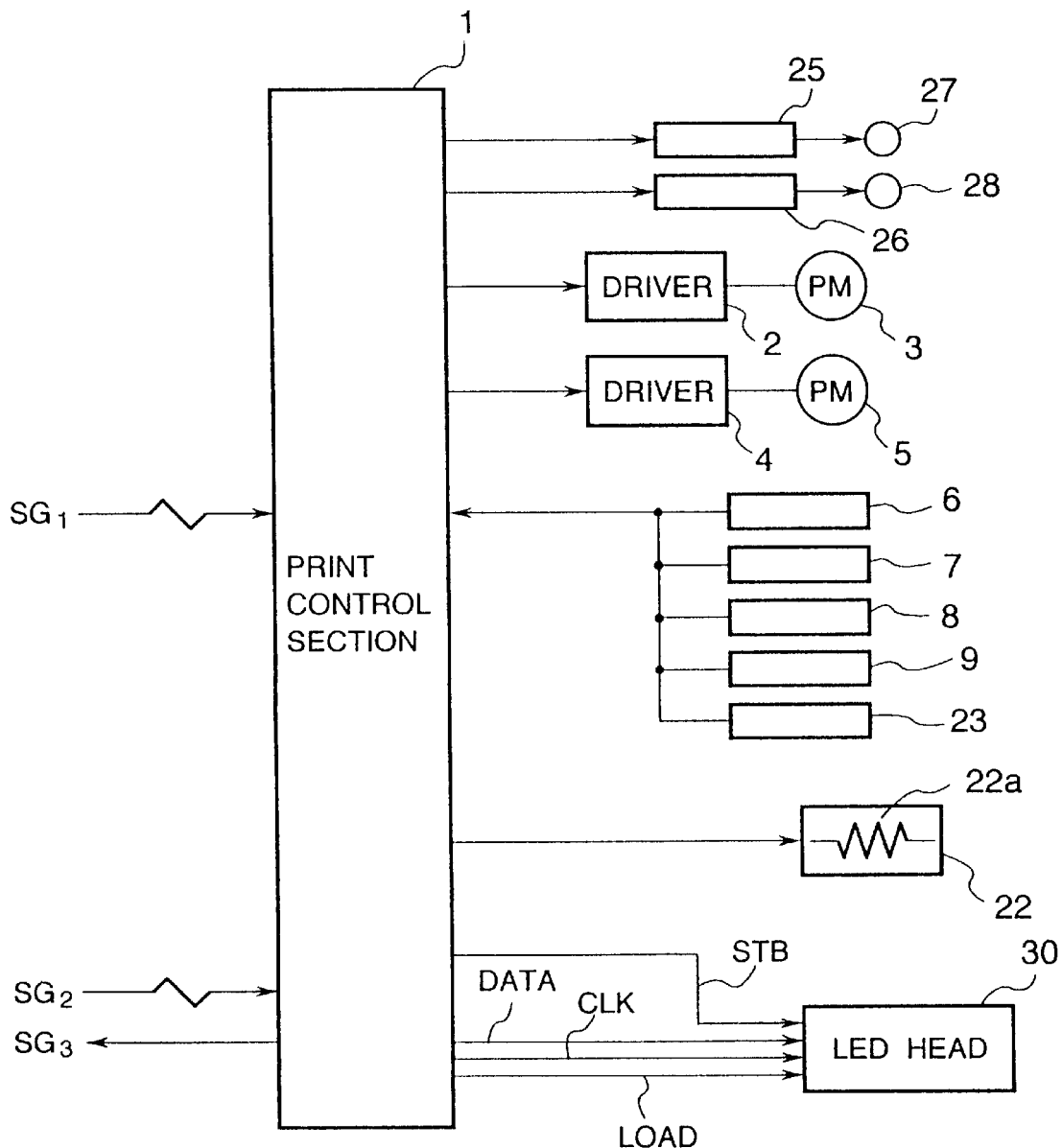
FIG. 3 is a block diagram showing the construction of a non-impact printer which includes an LED head according to a first embodiment of the present invention.

FIG. 3 is a block diagram showing the construction of a non-impact printer which includes a print head 30 according to a first embodiment of the present invention. In FIG. 3, a numeral 1 is a print control section which comprises such circuits as a microprocessor, a ROM, a RAM, input-output ports and a timer. The print control section 1 contained within the non-impact printer receives signals from a main controller (not shown) such as control signal $SG_1$ and video signal $SG_2$, transmits a timing signal $SG_3$ to the main controller, and controls the printing operation of the overall printer.

Also, a numeral 2 is a driver circuit; 3 is a pulse motor for developing and transferring processes; 4 is a driver circuit; and 5 is a pulse motor for transporting a paper. In addition, a numeral 6 is a sensor for detecting the presence of paper at the paper feed outlet; 7 is a sensor for detecting passage of printed paper at the paper exit; 8 is a sensor for detecting presence or absence of paper in a paper cassette; and 9 is a sensor for detecting the size of the paper contained in the paper cassette.

Also, a numeral 22 is a fixing section which comprises a heater 22a; and 23 is a sensor which detects the temperature of the fixing section 22. Numerals 25 and 26 are high voltage power supply sections; 27 is a developing section for depositing toner on an electrostatic latent image formed on a photosensitive drum (not shown); 28 is a transferring section for transferring the toner image formed on the photosensitive drum onto paper; and 30 is an LED head for forming the electrostatic latent image on the photosensitive drum.

The printing operation is performed as follows according to the control signals from the print control section 1. When the print control section 1 receives the video signal $SG_2$ of one scanning line, the print control section 1 transmits the latch signal LOAD to the LED head 30 and then the print data signal DATA as the bit data signal are held in the LED drivers of the LED head 30. The print control section 1 then transmits the drive signal STB to the LED drivers of the LED head 30, the light-emitting elements of the LED head 30 selectively light according to the print data signal DATA held in the LED drivers, and then an electrostatic latent image is formed on a surface of the photosensitive drum. Thereafter, toner is deposited by electrostatic force on the surface of the photosensitive drum by the developing section 27. The transferring section 28 transfers the toner image from the surface of the photosensitive drum onto a paper, and then the fixing section 22 fixes the toner image on the paper.

Figure 4:
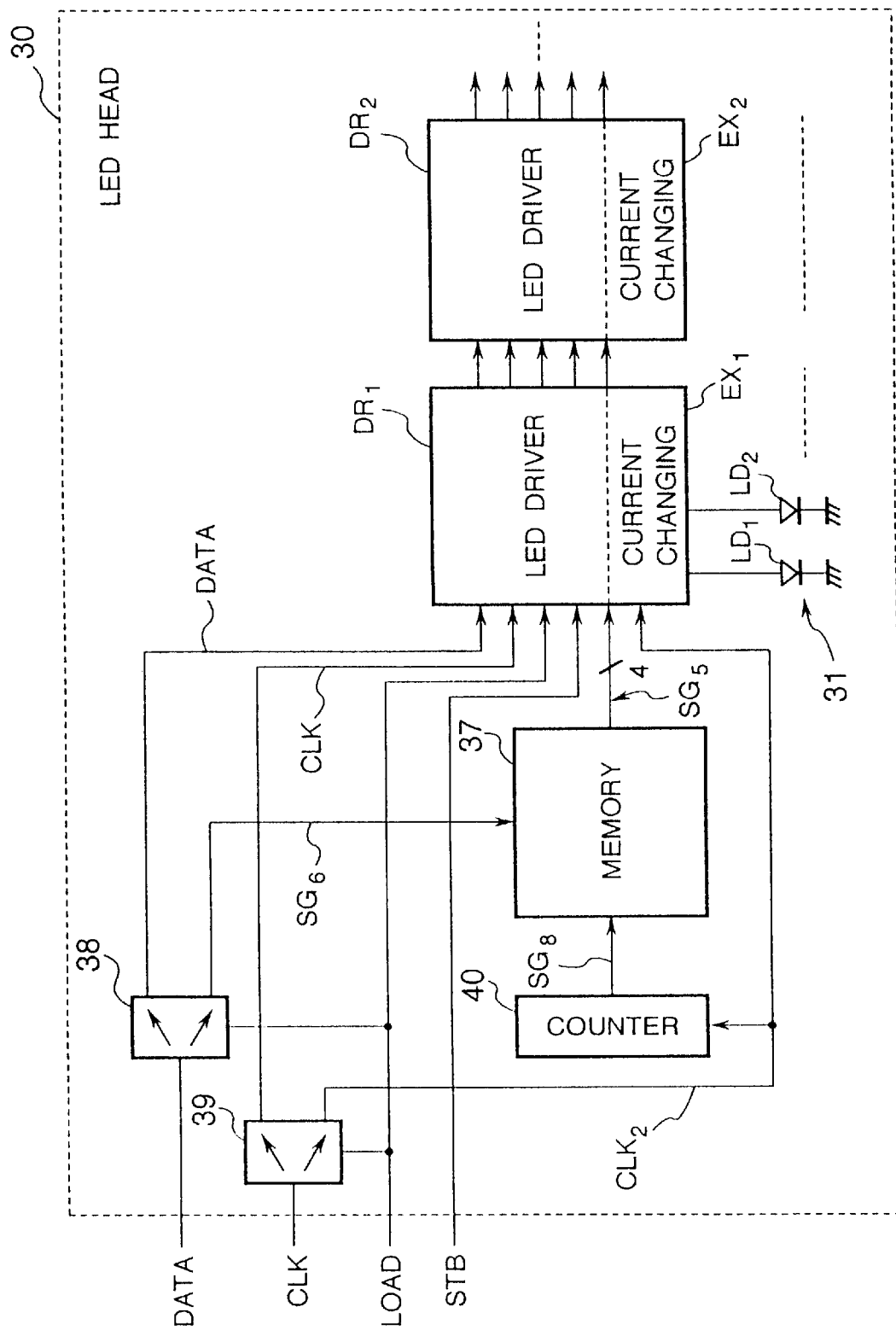
FIG. 4 is a block diagram showing the construction of the LED head of FIG. 3.

FIG. 4 is a block diagram showing the construction of the LED head 30 of FIG. 3. As indicated in FIG. 4, the LED head 30 comprises an LED array 31 including a plurality of light-emitting elements (LEDs) $LD_1$–$LD_{2560}$ (only $LD_1$ and $LD_2$ are shown in FIG. 4), LED drivers $DR_1$–$DR_{40}$ (only $DR_1$ and $DR_2$ are shown in FIG. 4) for selectively lighting the Light-emitting elements $LD_1$–$LD_{2560}$ on the basis of the print data signal DATA, and current changing circuits $EX_1$–$EX_{40}$ (only $EX_1$ and $EX_2$ are shown in FIG. 4) for changing the current values supplied to the individual light-emitting elements $LD_1$–$LD_{2560}$ from the LED drivers $DR_1$–$DR_{40}$.

The LED head 30 also comprises a non-volatile memory 37, for example, EPROM or EEPROM, which stores modification data related to the current values regulated by the current changing circuits $EX_1$–$EX_{40}$ for lighting all the light-emitting elements $LD_1$–$LD_{2560}$ at the same light intensity. The modification data inputted and stored in the non-volatile memory 37 are obtained by a measuring device (not shown in the figure) on the basis of the measured values of the individual light-emitting strengths of the light-emitting elements $LD_1$–$LD_{2560}$ at the manufacturing stage of the LED head 30 when using the LED drivers $DR_1$–$DR_{40}$ to light the light-emitting elements $LD_1$–$LD_{2560}$. At this time, the measurements include not only the variations in the characteristics of each light-emitting element $LD_1$–$LD_{2560}$, but also variations in the characteristics of the rod lens arrays (not shown in the figure) such as a SELFOC lens (trademark) which focuses the light emitted from the light-emitting elements $LD_1$–$LD_{2560}$ and the LED drivers $DR_1$–$DR_{40}$. In other words, the modification data stored in the non-volatile memory 37 are obtained on the basis of the light-emitting strength of the LED head 30 under the conditions of actual installation in the printer.

The LED head 30 also comprises a counter 40 for applying a clock signal $SG_8$ to the non-volatile memory 37 for transmitting the modification data stored in the non-volatile memory 37 to the current changing circuits $EX_1$–$EX_{40}$ prior to the printing operation.

The print data signal DATA are sent via a selector 38 to either the LED drivers $DR_1$–$DR_{40}$ or the non-volatile memory 37. A selector 39 sends the clock signal CLK to either the LED drivers $DR_1$–$DR_{40}$ or the counter 40 and the current changing circuits $EX_1$–$EX_{40}$. When the latch signal LOAD inputted to the selector 38 goes from low to high level, the selector 38 switches and the print data signal DATA are inputted to the non-volatile memory 37 as current instruction data $SG_6$ for instructing the value of the drive current of each light-emitting elements $LD_1$–$LD_{2560}$. When the latch signal LOAD inputted to the selector 39 goes from low to high level, the selector 39 switches and the clock signal CLK inputs a clock signal $CLK_2$ to the counter 40 and LED drivers $DR_1$–$DR_{40}$ for transmitting the modification data stored in the non-volatile memory 37 to the current changing circuits $EX_1$–$EX_{40}$. The current instruction data signal $SG_6$ are used in the manufacturing process for writing the current instruction values for the individual light-emitting elements $LD_1$–$LD_{2560}$ into the non-volatile memory 37.

Figure 5:
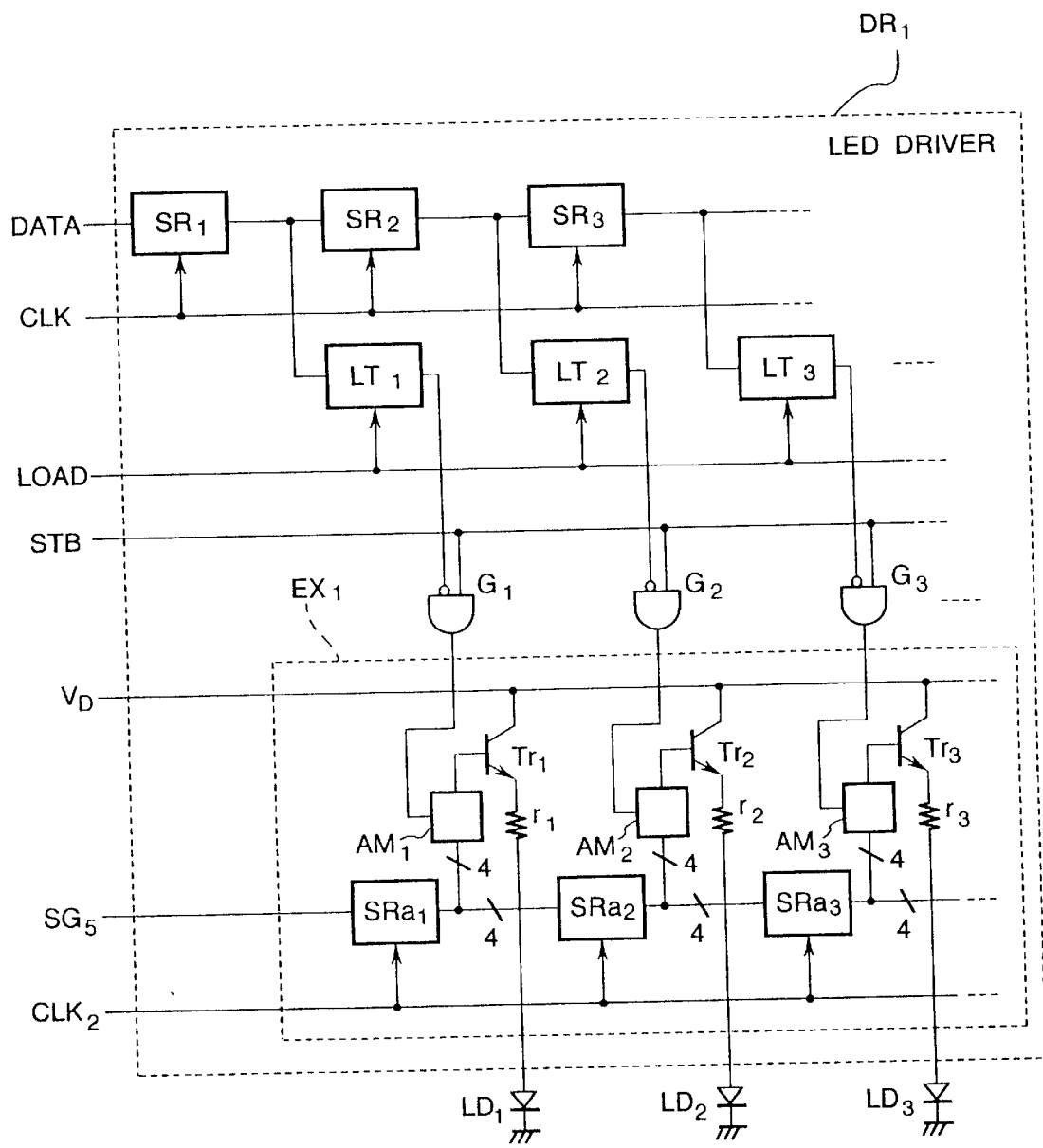
FIG. 5 is a block diagram showing the construction of the LED driver $DR_1$ and the current changing circuit $EX_1$ of FIG. 4.

FIG. 5 is a block diagram showing construction of the LED driver $DR_1$ and the current changing circuit $EX_1$ of FIG. 4. As shown in FIG. 5, the LED driver $DR_1$ comprises shift registers $SR_1$–$SR_{64}$ (only $SR_1$–$SR_3$ are shown in FIG. 5) for sequentially shifting the print data signal DATA in synchronization with the clock signal CLK, latches $LT_1$–$LT_{64}$ (only $LT_1$–$LT_3$ are shown in FIG. 5) for latching the print data signal DATA when the latch signal LOAD is inputted, and gate elements $G_1$–$G_{64}$ (only $G_1$–$G_3$ are shown in FIG. 5). Each of the LED drivers $DR_2$–$DR_{40}$ has the same construction as that of the LED driver $DR_1$. The current changing circuit $EX_1$ comprises switching elements $Tr_1$–$Tr_{64}$ (only $Tr_1$–$Tr_3$ are shown in FIG. 5), protective resistors $r_1$–$r_{64}$ (only $r_1$–$r_3$ are shown in FIG. 5), a power supply line $V_D$, shift registers $SRa_1$–$SRa_{64}$ (only $SRa_1$–$SRa_3$ are shown in FIG. 5), and amplifiers $AM_1$–$AM_{64}$ (only $AM_1$–$AM_3$ are shown in FIG. 5). When high level input signals from the $LT_1$–$LT_{64}$ and low level drive signal STB for performing the printing operation are applied to the gate elements $G_1$–$G_{64}$, high level outputs are produced from the gate elements $G_1$–$G_{64}$. Each of the current changing circuits $EX_2$–$EX_{40}$ has the same construction as that of the current changing circuit $EX_1$.

Figure 6:
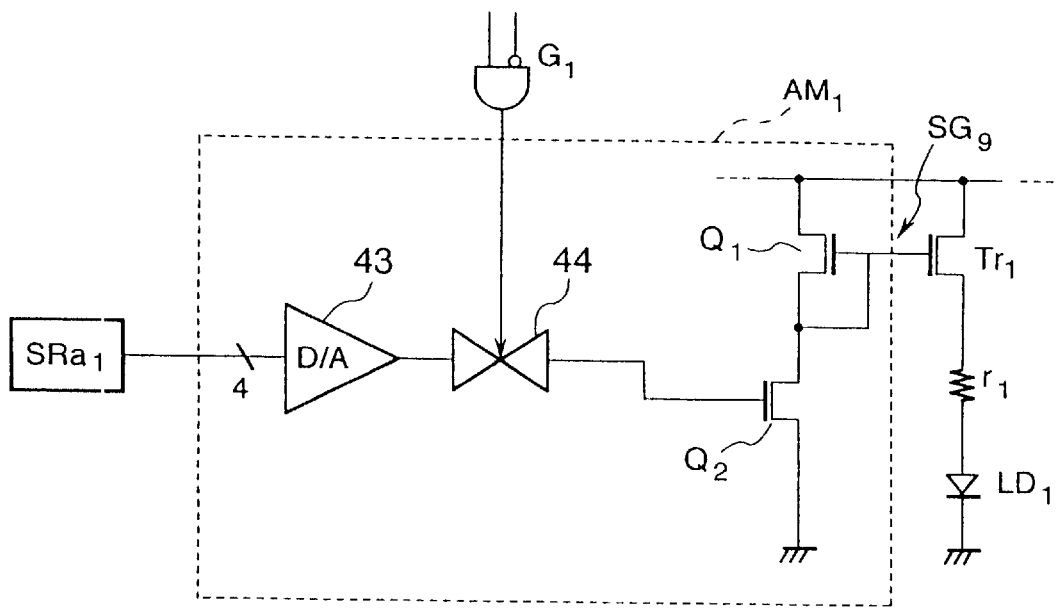
FIG. 6 is a schematic diagram showing the construction of the amplifier $AM_1$ of FIG. 5.

FIG. 6 is a schematic diagram showing construction of the amplifier $AM_1$ of FIG. 5. As indicated in FIG. 6, the amplifier $AM_1$ comprises a digital to analog (D/A) (converter 43, an analog switch 44, and transistors $Q_1$ and $Q_2$. The four-bit data from the shift register $SRa_1$ are applied to the D/A converter 43, the output from the gate element $G_1$ is applied to the analog switch 44, and then the adjustment signal $SG_9$ amplified by the transistors $Q_1$ and $Q_2$ is applied to the base of the switching element $Tr_1$.

Figure 7:
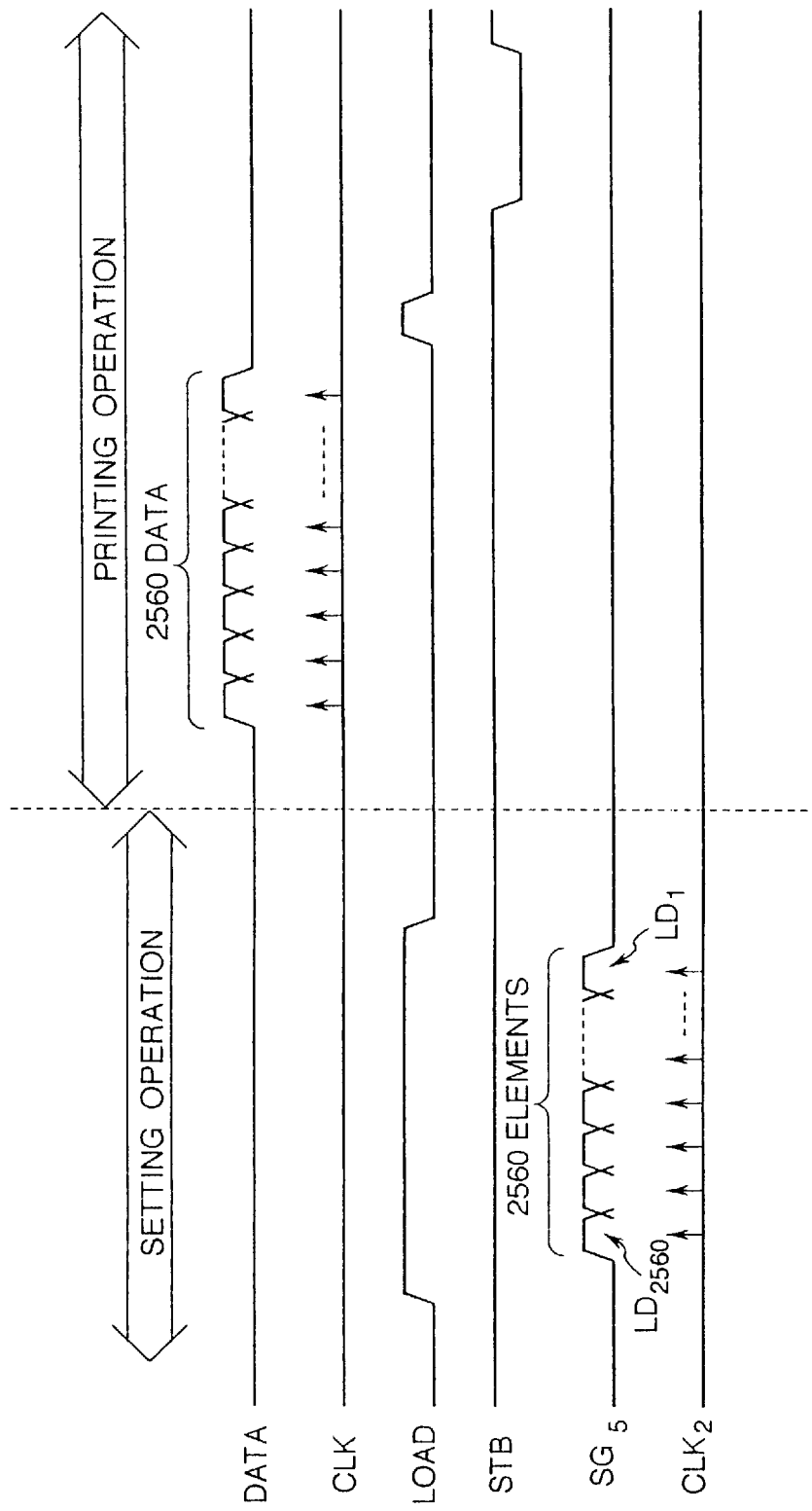
FIG. 7 is a timing chart showing the operation of the LED head of FIG. 4.

Following is a description of the operation of the LED head 30 according to the first embodiment with reference to FIGS. 4 and 5, and the timing chart of FIG. 7.

As indicated at the left in FIG. 7, prior to the actual printing operation, the setting operation is conducted. In the setting operation, the current instruction value for providing uniform light emission strength of the light-emitting elements $LD_1$–$LD_{2560}$ are applied from the non-volatile memory 37 to the shift registers $SRa_1$–$SRa_{2560}$ of the current changing circuits $EX_1$–$EX_{40}$. This setting operation is performed by setting the latch signal LOAD to high level, as shown in the left of FIG. 7, and applying the clock signal $CLK_2$ to the counter 40 and the current changing circuits $EX_1$–$EX_{40}$. When the clock signal $CLK_2$ is applied, an address signal $SG_8$ is sent from the counter 40 to the non-volatile memory 37, and a four-bit current instruction signal $SG_5$, wherein the bit width corresponds to a different digital value, is transmitted sequentially from the non-volatile memory 37 to the shift registers $SRa_1$–$SRa_{2560}$. This setting operation of the current instruction signal to the shift registers $SRa_1$–$SRa_{2560}$ is preferably performed prior to each sheet of printing. Consequently, even in the event the current instruction values in the shift registers $SRa_1$–$SRa_{2560}$ are changed by an external disruption such as static electricity, the correct current instruction values are input at the next printing.

Figure 8:
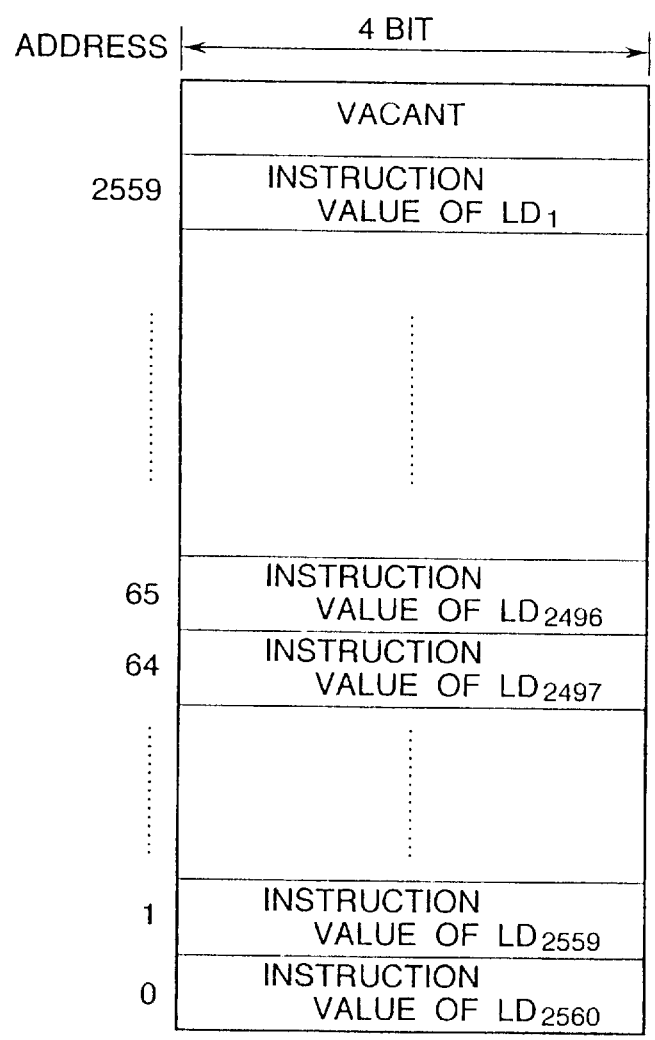
FIG. 8 is an explanatory diagram for explaining the modification data stored in the memory area of a non-volatile memory.
Figure 9:
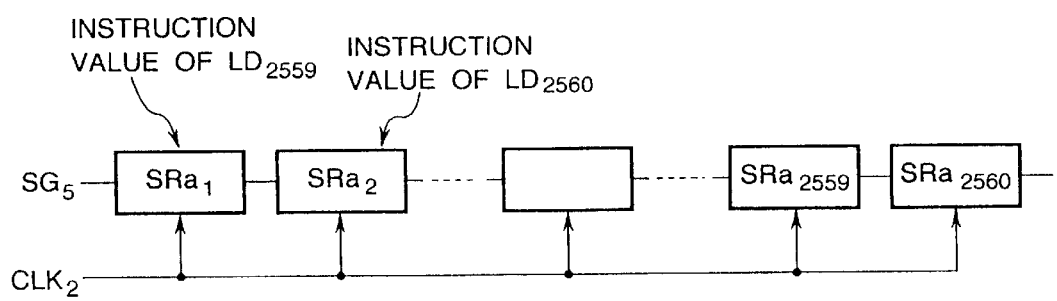
FIG. 9 is an explanatory diagram for explaining the state of the shift registers when the transmission of the current instruction values from the non-volatile memory is started.
Figure 10:
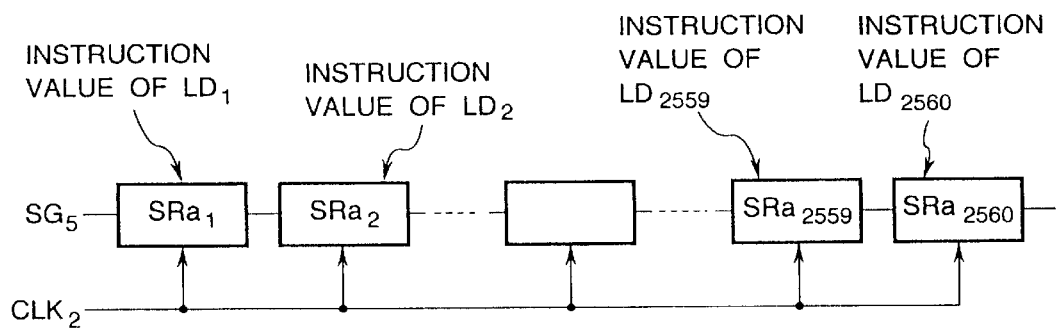
FIG. 10 is an explanatory diagram for explaining the state of the shift registers when the transmission of the current instruction values from the non-volatile memory is finished.

FIG. 8 is an explanatory diagram for explaining data stored in the memory area of a non-volatile memory 37, FIG. 9 is an explanatory diagram for explaining the state of the shift registers $SRa_1$–$SRa_{2560}$ when the transmission of the current instruction values from the non-volatile memory 37 is started, and FIG. 10 an explanatory diagram for explaining the state of the shift registers $SRa_1$–$SRa_{2560}$ when the transmission of the current instruction values from the non-volatile memory 37 is finished. As indicated in FIG. 8, the respective four-bit current instruction values (corresponding to the current values which flow in the light-emitting elements $LD_{2560}$–$LD_1$) are entered in the non-volatile memory 37 in sequence from the lowest address (address 0 in FIG. 8). Consequently, when the clock pulses of the current instruction clock signal $CLK_2$ (shown in FIG. 4) are applied to the counter 40 at the same number of times as that of the light-emitting element $LD_1$–$LD_{2560}$, the sequential address is indicated by the address signal $SG_8$ from the counter 40 and the current instruction values for the light-emitting elements $LD_{2560}$–$LD_1$ are transmitted in this sequence.

The printing operation is then started. The print data signal DATA is inputted to the shift registers $SR_1$–$SR_{2560}$ in synchronization with the clock signal CLK and latched in the latches $LT_1$–$LT_{2560}$ at the high level of the latch signal LOAD. The print drive signal STB goes to Low level and the amplifiers $AM_1$–$AM_{2560}$ are operated according to the outputs of the gate elements $G_1$–$G_{2560}$ corresponding to the on state bits among the print data signal DATA. The amplifiers $AM_1$–$AM_{2560}$ for controlling current in the light-emitting elements $LD_1$–$LD_{2560}$ supply current value corresponding to the four-bit digital current instruction values contained in the shift registers $SRa_1$–$SRa_{2560}$ to the light-emitting elements.

Figure 11:
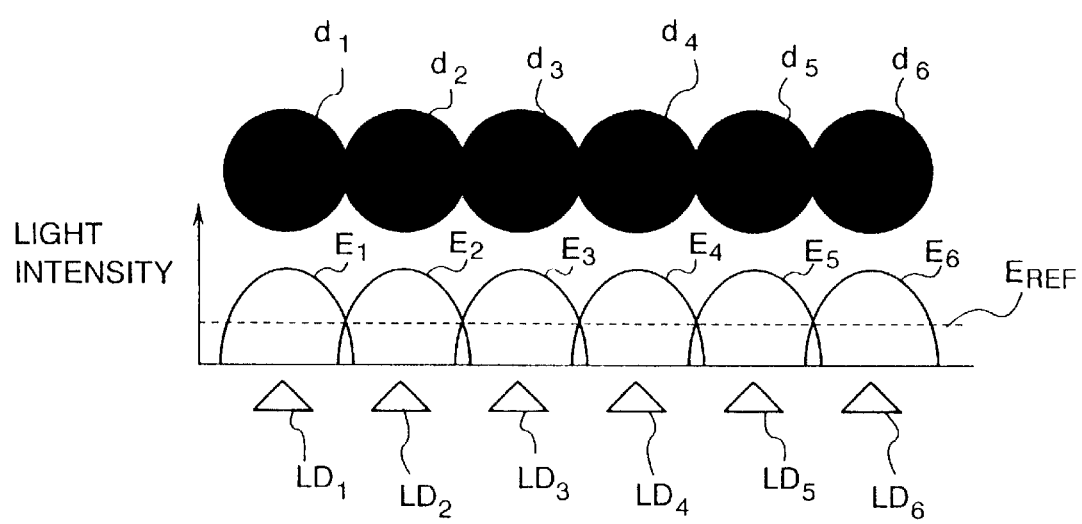
FIG. 11 shows light intensity of the light-emitting elements of FIG. 4 and printed dots formed by the light-emitting elements.

In this case, since the light emission strength of the light-emitting elements $LD_1$–$LD_{2560}$ has been adjusted, it is not necessary to vary the light emission time. Therefore, the electrostatic latent image dots formed on the photosensitive drum are not elongated into ellipses in the circumference direction of the photosensitive drum, but, as indicated in the upper side of FIG. 11, the respective dots formed by the light-emitting elements $LD_1$–$LD_{2560}$ are circles of nearly the same size. Consequently, as a result of this embodiment, the printing quality can be improved.

Also, when printing according to graphic data, since the dot size can be made uniform, the production of unevenness of print density can be prevented.

Further, since the current in the light-emitting elements $LD_1$–$LD_{2560}$ is adjusted on the basis of the measured result of the light emission strength of each light-emitting element $LD_1$–$LD_{2560}$, adjustment can be performed in regard to characteristic variations not only in the light-emitting elements $LD_1$–$LD_{2560}$, but also in the LED drivers $DR_1$–$DR_{40}$ and in the rod lens array.

SECOND EMBODIMENT

Following is a description of a second embodiment of the present invention with reference to the attached drawings.

Figure 12:
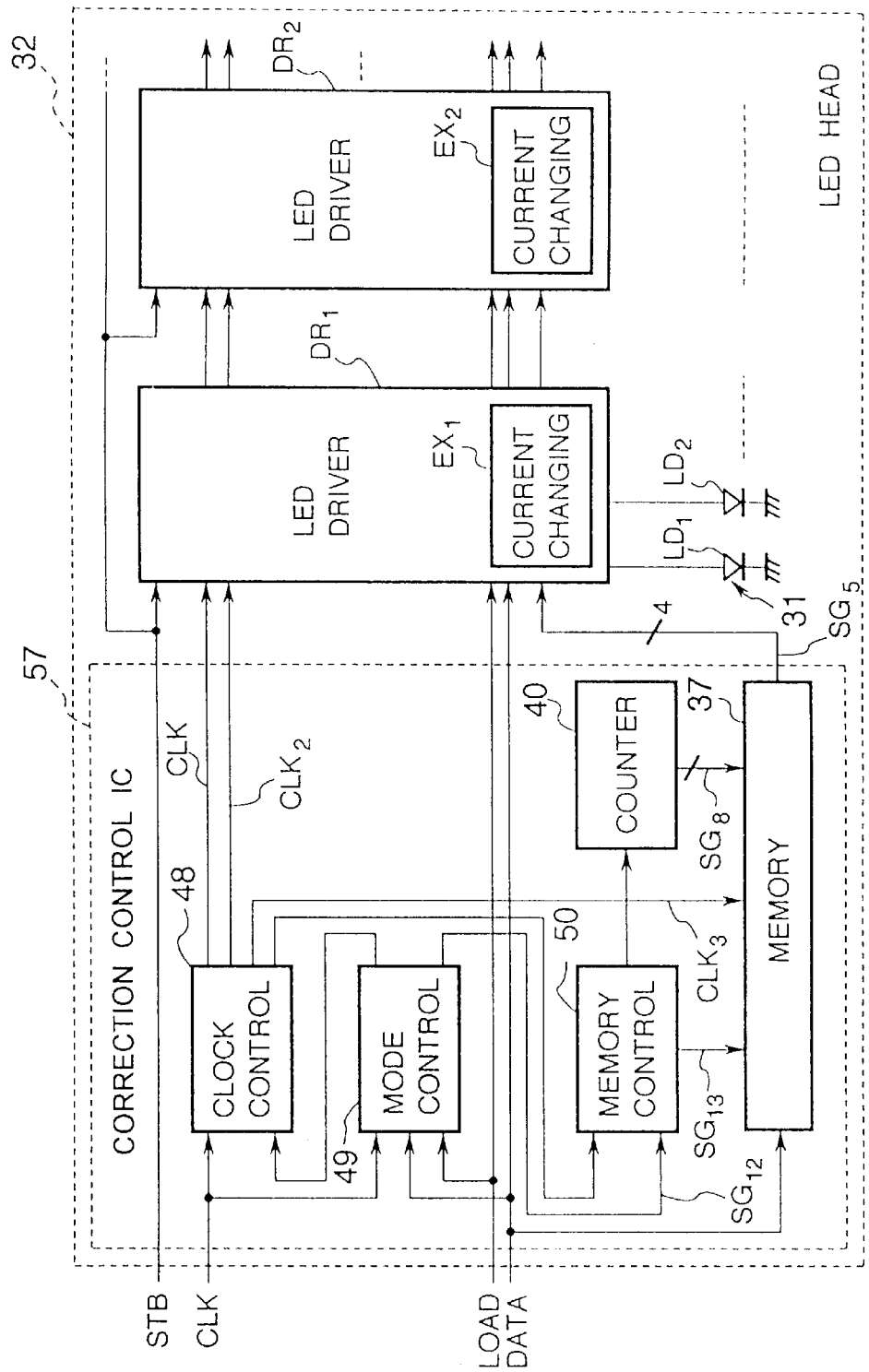
FIG. 12 is a block diagram showing an LED head according to a second embodiment of the present invention.
Figure 13:
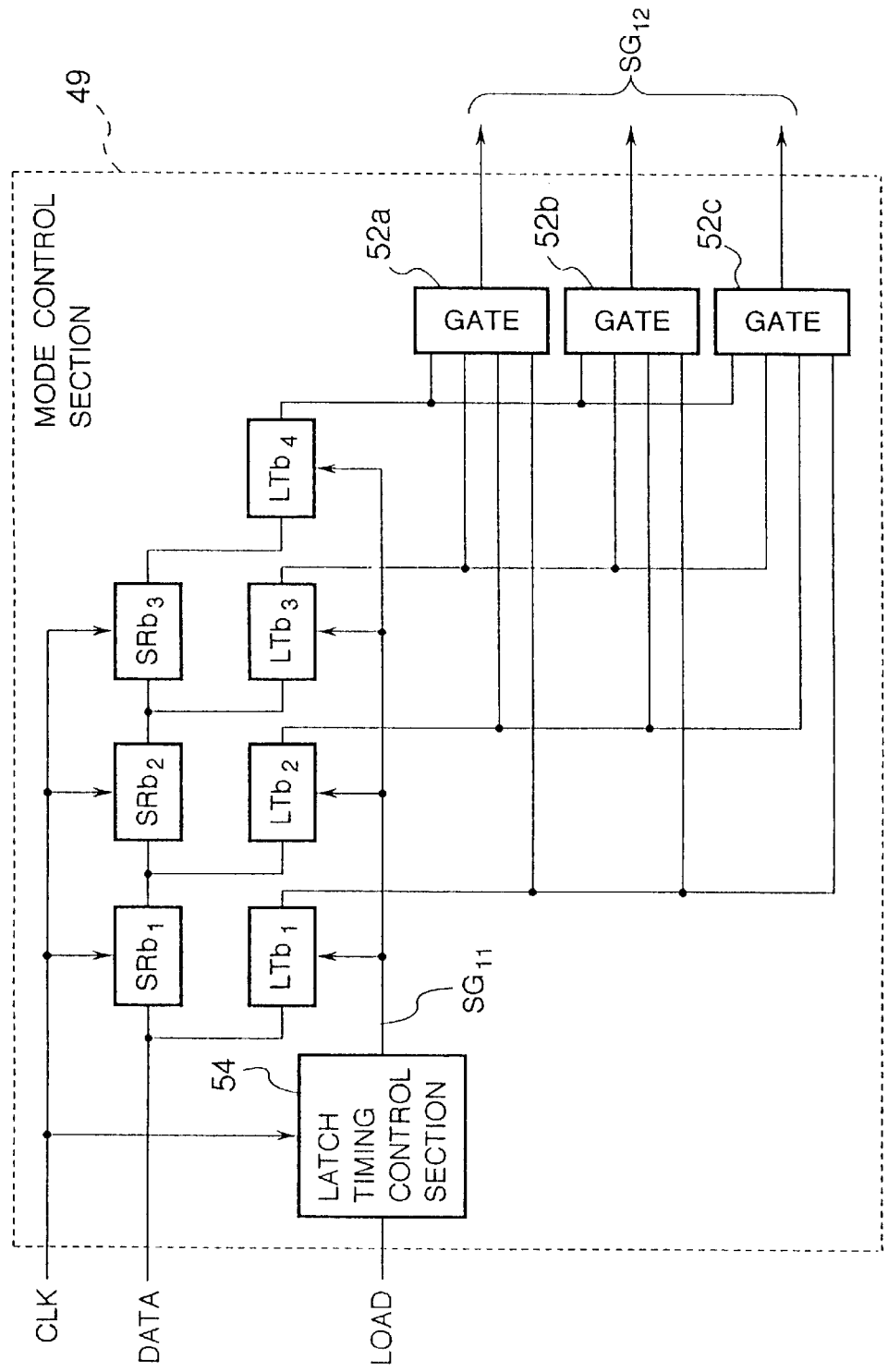
FIG. 13 is a block diagram showing the construction of a mode control section of FIG. 12.
Figure 14:
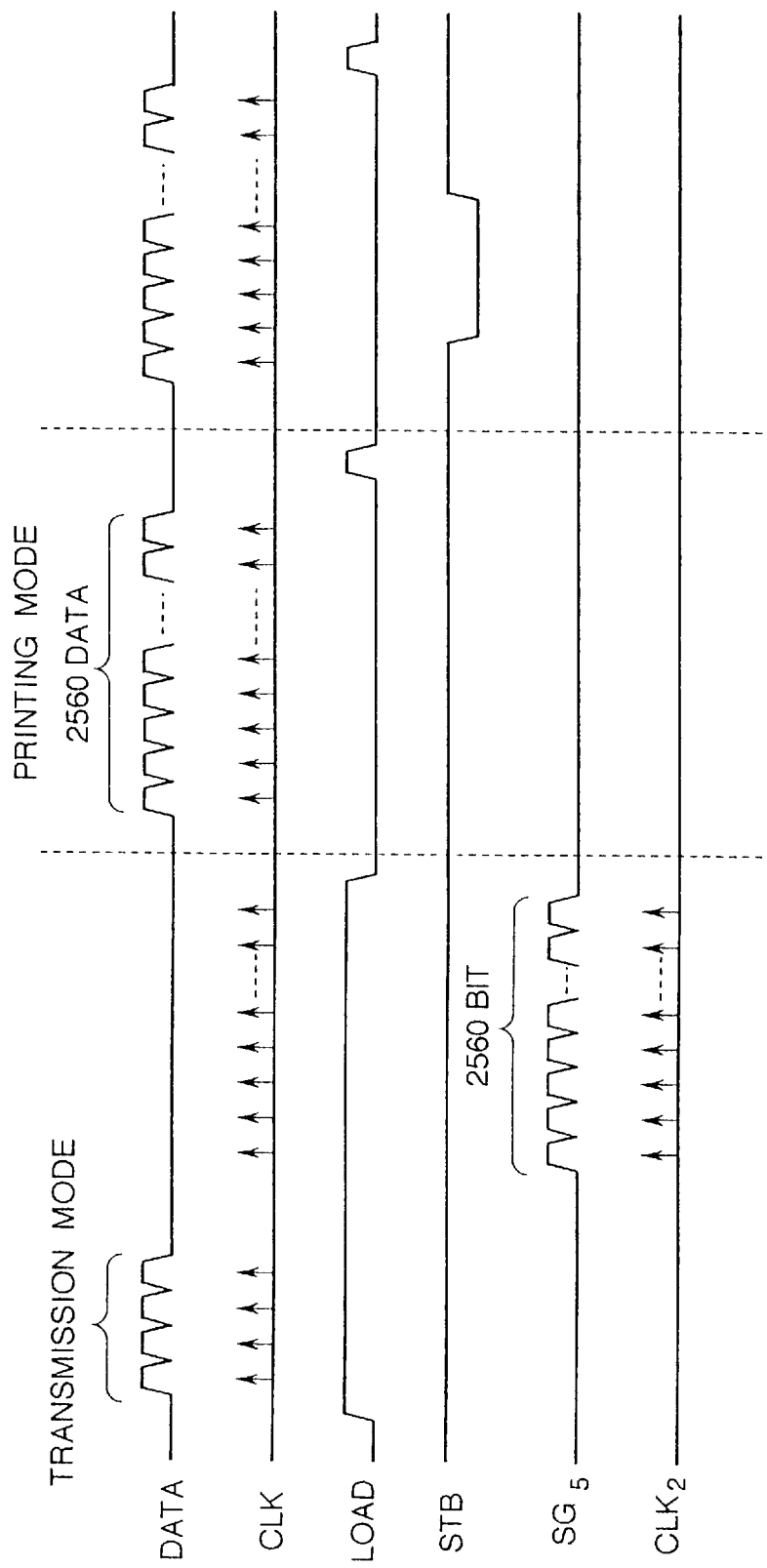
FIG. 14 and FIG. 15 are timing charts showing the operation of the LED head of FIG. 12.
Figure 15:
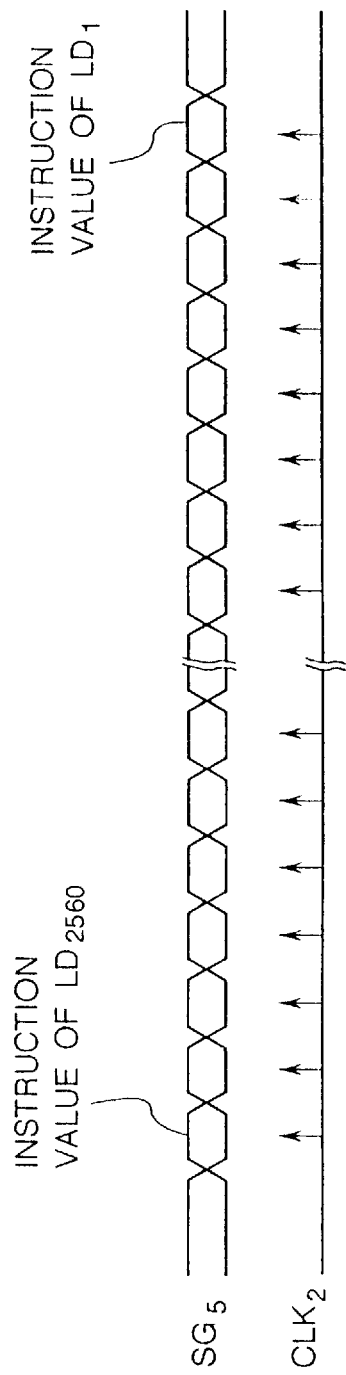

FIG. 12 is a block diagram showing an LED head 32 according to the second embodiment of the present invention, FIG. 13 is a block diagram showing construction of a mode control section 49, FIG. 14 is a timing chart showing the printing mode in which the light-emitting elements $LD_1$–$LD_{2560}$ are selectively emitted, and FIG. 15 is a timing chart showing the transmission mode in which the current instruction value is transmitted from the memory 37 to the LED drivers $DR_1$–$DR_{40}$.

In this embodiment, the LED head 32 comprises a correction control IC 57 in order to switch among the printing mode, the transmission mode, and the writing mode in which the current instruction values are written in the non-volatile memory 37. The correction control IC 57 comprises the non-volatile memory 37, a counter 40, a clock control section 48, a mode control section 49 as a mode switching stage, and a memory control section 50.

The current instruction values for adjusting the current supplied to each light-emitting element $LD_1$–$LD_{2560}$ are stored beforehand in the non-volatile memory 37 during the manufacturing process and transmitted by the memory control section 50 to the current changing circuits $EX_1$–$EX_{40}$ in the LED drivers $DR_1$–$DR_{40}$ as the current instruction signals $SG_5$. Construction of the LED drivers $DR_1$–$DR_{40}$ is the same as that described in the first embodiment (FIG. 4).

In the printing mode, the print data signals DATA sent from the print control section (shown in FIG. 3) to the LED head 32 go via the correction control IC 57 to the LED drivers $DR_1$–$DR_{40}$ and are inputted at the high level pulse of the latch signal LOAD.

The latch signal LOAD is also set to high level in the transmission mode in order that the current instruction values can be read out from the non-volatile memory 37 using the actual print data signal DATA and the clock signal CLK, and sent to the current changing circuits $EX_1$–$EX_{40}$. In FIG. 12, STB denotes a printing drive signal.

Next, the mode control section 49 for switching among the printing mode, the transmission mode and the writing mode is described. As indicated in FIG. 13, the mode control section 49 comprises a latch timing control section 54, three shift registers $SRb_1$–$SRb_3$, four latches $LTb_1$–$LTb_4$, and three gate circuits 52a, 52b and 52c. The latch timing control section 54 starts to operate when the latch signal LOAD is set to high level. The print data signal DATA is synchronized to the clock signal CLK and sequentially shifted to the shift registers $SRb_1$–$SRb_3$. After the latch signal LOAD goes to high level, the latch timing control section 54 outputs a latch instruction signal $SG_{11}$ to the latches $LTb_1$–$LTb_4$ at the timing of the fourth signal in the clock signals CLK.

As a result, each bit of the serially transmitted data signal DATA is latched in the latches $LTb_1$–$LTb_4$ as parallel data. The mode at this time is determined on the basis of the combination of the values of the parallel data, and the mode enable signals $SG_{12}$ are outputted from the respective gate circuits 52a, 52b and 52c. In this manner, the appropriate mode is selected from among the printing mode, the transmission mode and the writing mode.

In the transmission mode, the mode enable signal $SG_{12}$ from the mode control section 49 is sent to the memory control section 50 and the clock control section 48 when sending the current instruction values as the current instruction signals $SG_5$ to the current changing circuits $EX_1$–$EX_{40}$.

The clock signal CLK sent from the print control section 1 (shown in FIG. 3) is transmitted via the clock control section 48 to the memory control section 50 and according to the clock signal CLK, the counter 40 sequentially counts up. According to the counted value, the address signal $SG_8$, the instruction signal $SG_{13}$ from the memory control section 50, and a clock signal $CLK_3$ from the clock control section 48, the current instruction values stored in the memory control section 50 are read out sequentially.

As indicated in FIG. 15, the current instruction values are synchronized to the current instruction clock signal $CLK_2$ output from the clock control section 48 and sent to the current changing circuits $EX_1$–$EX_2$. Except for the above description, the second embodiment is the same as the first embodiment.

THIRD EMBODIMENT

Following is a description of a third embodiment of the present invention with reference to the attached drawings.

Figure 16:
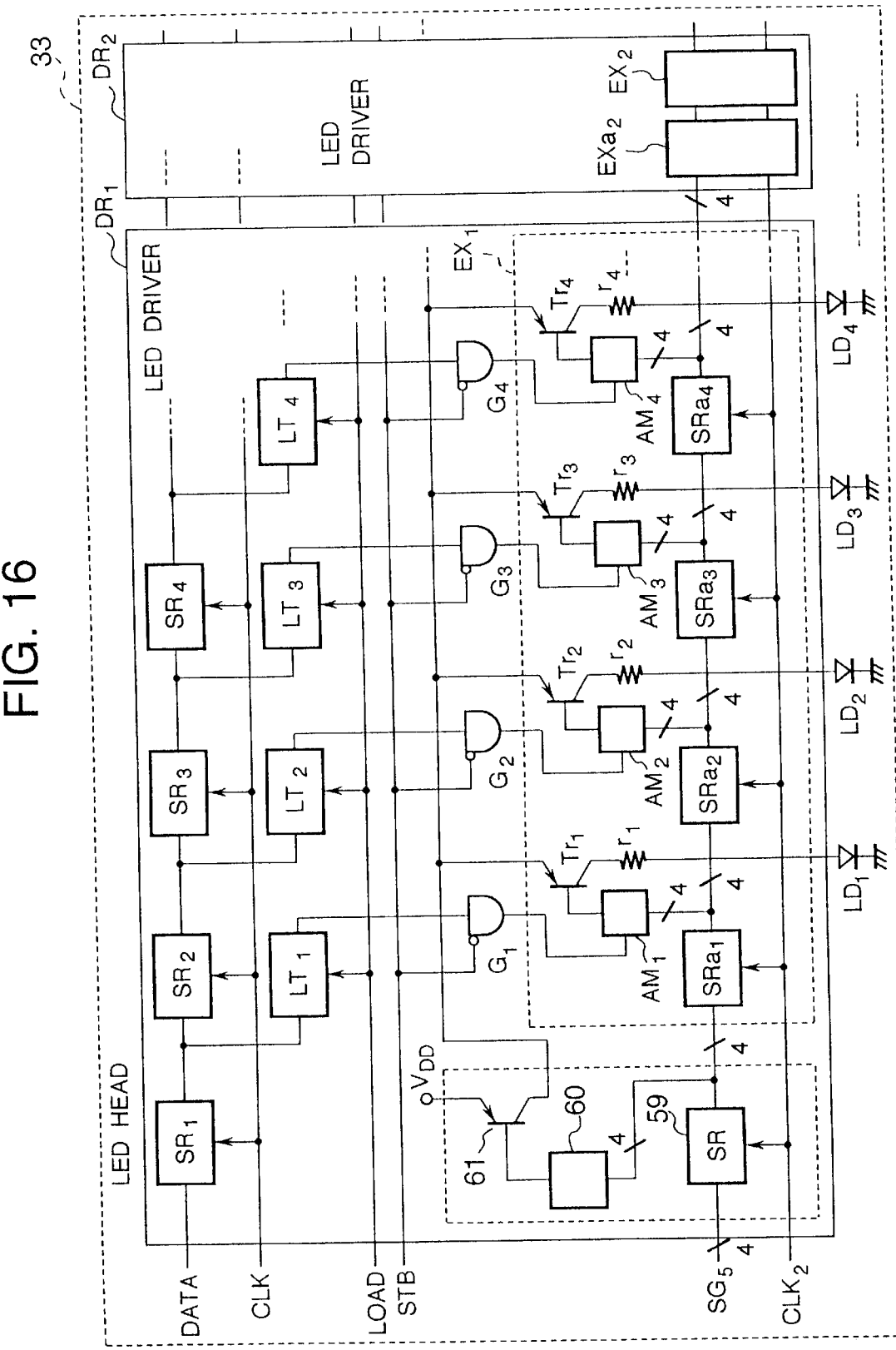
FIG. 16 is a block diagram showing an LED head according to a third embodiment of the present invention.
Figure 17:
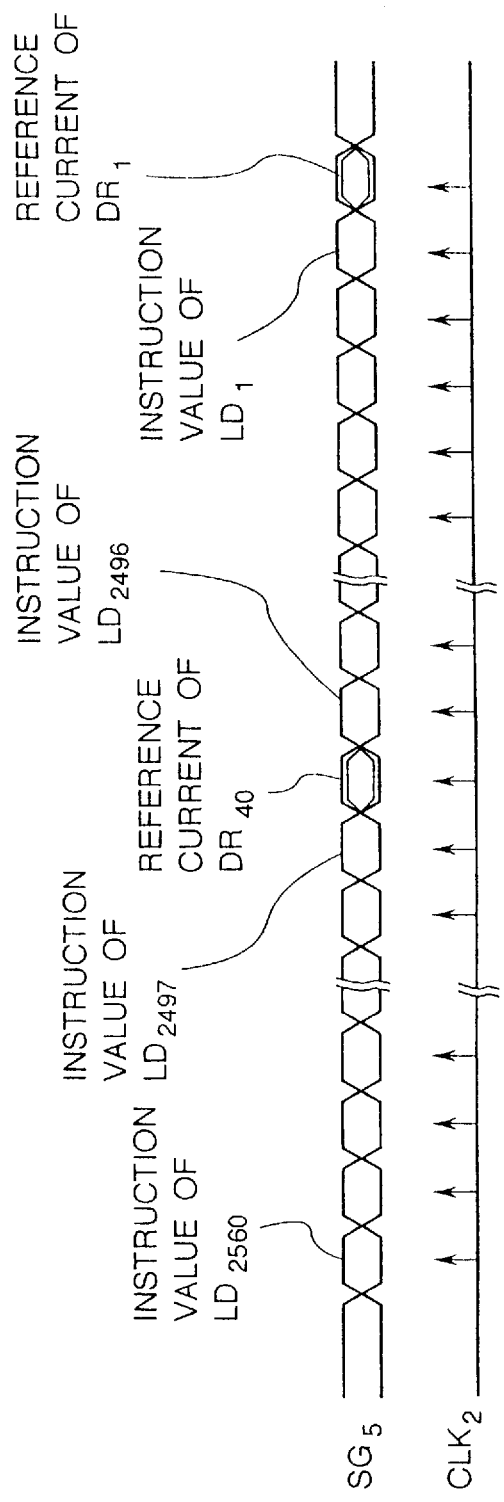
FIG. 17 is a timing chart showing the transmission mode in which the current instruction values are transmitted from the memory to the LED drivers.

FIG. 16 is a block diagram showing an LED head 33 which includes LED drivers according to the third embodiment, and FIG. 17 is a timing chart showing the transmission mode in which the current instruction values as modification data are transmitted from the memory 37 (shown in FIG. 4) to the LED drivers of the LED head 33. In the figures, the same symbols are used to designate parts having the same construction as shown in FIG. 5, and the descriptions thereof are omitted.

In the third embodiment, the LED head 33 comprises LED drivers $DR_1$–$DR_{40}$. Each $DR_1$–$DR_{40}$ comprises a monolithic semiconductor IC. Each LED driver $DR_1$–$DR_{40}$ (only $DR_1$ and $DR_2$ are shown in FIG. 16) comprises a current changing circuit $EX_1$–$EX_{40}$ (only $EX_1$ and $EX_2$ are shown in FIG. 16) for adjusting the drive current which flow into the respective light-emitting elements $LD_1$–$LD_{2560}$. The LED driver $DR_1$–$Dr_{40}$ also comprises reference-current changing circuits $EXa_1$–$EXa_{40}$ (only $EXa_1$ and $EXa_2$ are shown in FIG. 16) which change the reference current applied to each reference-current changing circuits $EXa_1$–$EXa_{40}$ by changing the current flowing through the transistor 61.

Each reference-current changing circuit $EXa_1$–$EXa_{40}$ comprises a four-bit shift register (SR) 59, an amplifier 60 for adjusting the current according to the digital value stored in the shift register 59, and a transistor as a switching element 61 controlled according to the output of the amplifier 60. As a result, the reference-current instruction value can be stored in the shift register 59 as a digital reference electrical energy instruction value. The shift register 59 of each reference-current changing circuit $EXa_1$–$EXa_{40}$ is connected to the lead shift register (for example, $SRa_1$, $SRa_{65}$, ... ) of each current changing circuit $EX_1$–$EX_{40}$.

In the third embodiment, not only can the current flowing in each light-emitting element $LD_1$–$LD_{2560}$ be adjusted by current changing circuits EX1–EX40, but also the reference current of each LED driver IC chip $DR_1$–$DR_{40}$ can be individually adjusted by reference-current changing circuits $EXa_1$–$EXa_{40}$. Consequently, as indicated in FIG. 17, at each transmission of sixty-four times of current instruction values for each light-emitting element $LD_1$–$LD_{2560}$, one reference-current instruction value of each LED driver $DR_1$–$DR_{40}$ is transmitted. In the third embodiment, each LED driver $DR_1$–$DR_{40}$ drives sixty-four light-emitting elements.

Following is a description of a method for storing the current instruction values and reference-current instruction values in the non-volatile memory 37 (shown in FIG. 4).

Figure 18:
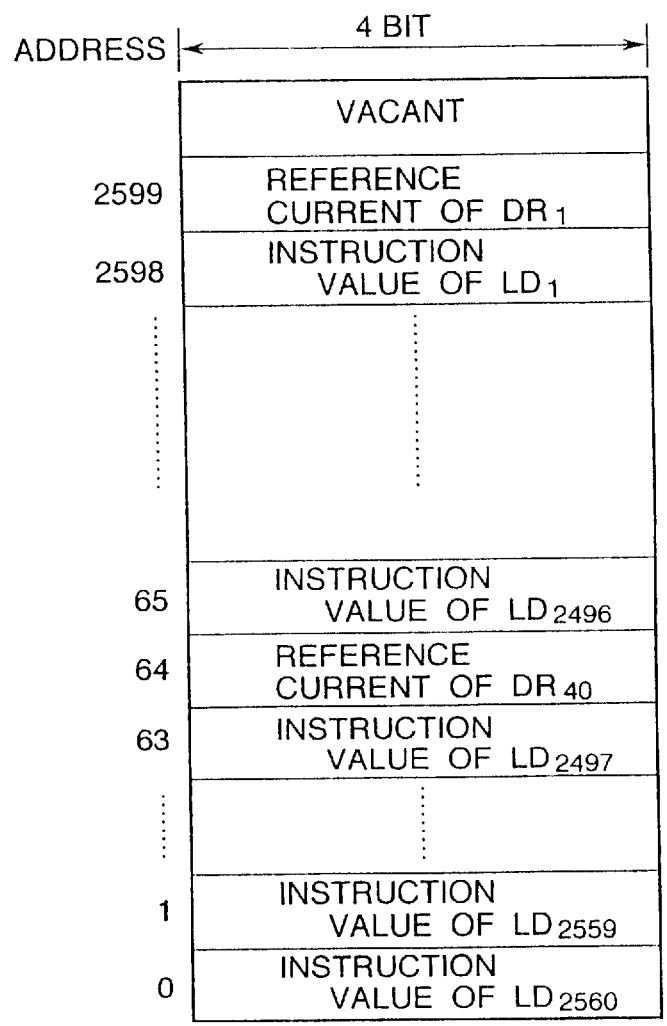
FIG. 18 is an explanatory diagram for explaining the modification data stored in the memory area of the non-volatile memory.
Figure 19:
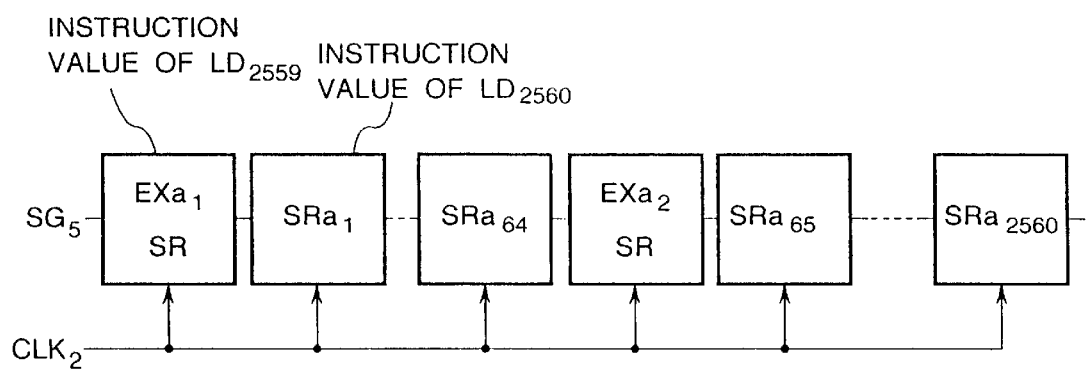
FIG. 19 is an explanatory diagram for explaining the state of each shift register SR of the reference-current changing circuits $EXa_1$–$EXa_{40}$ and the shift registers $SRa_1$–$SRa_{2560}$ at the start of the transmission of the signal $SG_5$.
Figure 20:
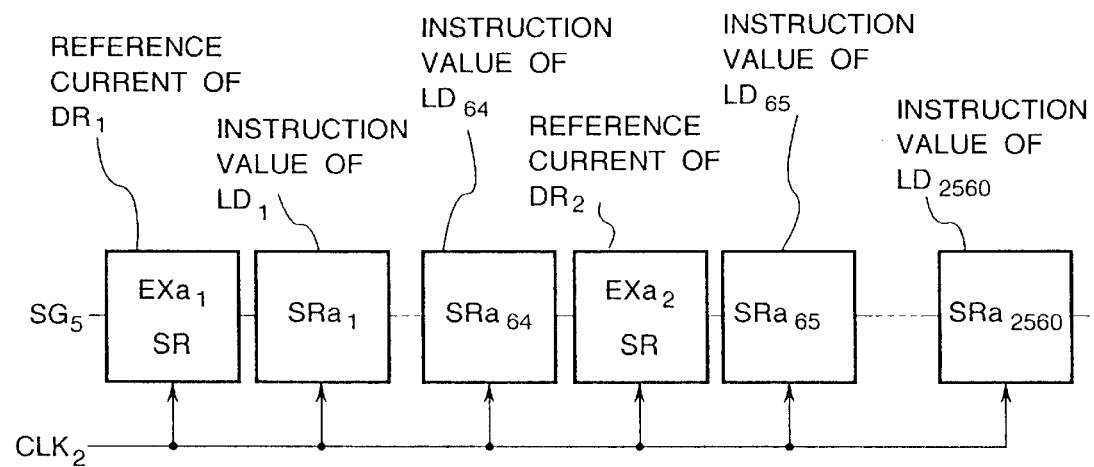
FIG. 20 is an explanatory diagram for explaining the state of the each shift register SR of the reference-current changing circuits $EXa_1$–$EXa_{40}$ and the shift registers $SRa_l$–$SRa_{2560}$ at the end of the transmission of the signal $SG_5$.

With respect to the third embodiment, FIG. 18 is an explanatory diagram for explaining the memory area of the non-volatile memory 37, FIG. 19 is an explanatory diagram for explaining the state of each shift register 59 of the reference-current changing circuits $EXa_1$–$EXa_{40}$ and the shift registers $SRa_1$–$SRa_{2560}$ at the start of the transmission of the signal $SG_5$, and FIG. 20 is an explanatory diagram for explaining the state of the each shift register 59 of the reference-current changing circuits $EXa_1$–$EXa_{40}$ and the shift registers $SRa_1$–$SRa_{2560}$ at the end of the transmission of the signal $SG_5$.

The respective four-bit current instruction values for the light-emitting elements $LD_{2560}$–$LD_{2497}$, reference-current instruction value for the LED driver $DR_{40}$, current instruction values for light-emitting elements $LD_{2496}$, ... , $LD_1$, and reference-current instruction value for LED driver $DR_1$ are entered in the non-volatile memory 37 in sequence indicated in FIG. 18 from the lowest address.

Consequently, when the current instruction clock signal $CLK_2$ is applied to the counter 40 (shown in FIG. 4) at the same number of times as that of the light-emitting elements $LD_1$–$LD_{2560}$ and LED drivers $DR_1$–$DR_{40}$ (i.e., 2600 clock signals) is applied to the counter 40, the sequential address is indicated by the address signal $SG_8$ from the counter 40 and the current instruction values for the light-emitting elements $LD_{2560}$–$LD_{2497}$, reference-current instruction value for the LED driver $DR_{40}$, current instruction values for light-emitting elements $LD_{2496}$–$LD_1$, and reference-current instruction value for the LED driver $DR_1$ are transmitted in sequence.

As shown in FIG. 17, when the current instruction values for the light-emitting elements $LD_1$–$LD_{2560}$ and reference-current instruction values for each shift register 59 are respectively transmitted to the current changing circuits $EX_1$–$EX_{40}$ and the reference-current changing circuits $EXa_1$–$EXa_{40}$, the current instruction values are stored in the respective shift registers $SRa_1$–$SRa_{2560}$, and the reference-current instruction values are stored in the shift registers 59 of the respective reference-current changing circuits $EXa_1$–$EXa_{40}$, thereby enabling adjustment of both the current flow in the respective light-emitting elements $LD_1$–$LD_{2560}$ and the reference current values for the respective LED drivers $DR_1$–$DR_{40}$.

Consequently, in the manufacturing process of the LED drivers $DR_1$–$DR_{40}$, the characteristic variations among the produced IC chips can be reduced. In addition, even in cases where the variation in characteristics of the light-emitting elements $LD_1$–$LD_{2560}$ is too large, the characteristic variation can be eliminated by changing the reference-current in addition to current instruction values for the light-emitting elements. Except for the above description, the third embodiment is the same as the first embodiment.

FOURTH EMBODIMENT

In cases where the characteristic variations of the light-emitting elements $LD_1$–$LD_{2560}$ are small, the printing quality can be improved by using an LED head 30 described in the first embodiment (FIG. 4). However, when the characteristic variations of the light-emitting elements $LD_1$–$LD_{2560}$ are large, an LED head 33 described in the third embodiment (FIG. 16) needs to be used in order to improve printing quality. Accordingly, in the fourth embodiment, either the LED head 30 of FIG. 4 or the LED head 33 of FIG. 16 can be selected according to the extent of the characteristic variations of the light-emitting element, $LD_1$–$LD_{2560}$.

In the LED head 30, 2560 current instruction values are generated in order to reduce the characteristics variations among 2560 light-emitting elements $LD_1$–$LD_{2560}$, while in the LED head 33, in order to reduce the characteristics variations among 2560 light-emitting elements $LD_1$–$LD_{2560}$, in addition to 2560 current instruction values, reference-current instruction values for the respective LED drivers $DR_1$–$DR_{40}$ (40 in this embodiment) are produced.

Consequently, in the LED head 30, 2560 current instruction values need to be transmitted to the non-volatile memory 37 in synchronization with the current instruction clock signal $CLK_2$, while in the LED head 33, reference-current instruction values and current instruction values need to be transmitted in synchronization with 2600 current instruction clock signals $CLK_2$ to the non-volatile memory 37, thereby requiring changes of the clock signal generating means (not shown in the figure) and increasing the cost.

FIG. 21 is an explanatory diagram for explaining the memory area of the non-volatile memory 37. In this case, the operating mode can be selected between the first mode, wherein the characteristics variations of the light-emitting elements $LD_1$–$LD_{2560}$ are reduced by only the current instruction values for the light-emitting elements $LD_1$–$LD_{2560}$, and the second mode, wherein the characteristics variations of the light-emitting elements $LD_1$–$LD_{2560}$ are reduced by the reference-current instruction values for the reference-current changing circuit $EX_1$–$EX_{40}$ and current instruction values for the light-emitting elements $LD_1$–$LD_{2560}$.

Also, the non-volatile memory 37 (shown in FIG. 4) having a capacity of storing both the reference-current instruction values and the current instruction values is installed in the LED head. At the start of printing, the number of the current instruction clock signal $CLK_2$ for transmitting the reference-current instruction values and current instruction values to the non-volatile memory 37, is set the number of the reference-current instruction value and the current instruction value.

In both the first and second modes, the reference-current instruction values and the current instruction values are stored in the largest address side of the memory address of the non-volatile memory 37, and the area not storing the reference-current instruction values and current instruction values is taken as a vacant area.

Consequently, in the first mode, as indicated in FIGS. 9 and 10, the current instruction values are transmitted in sequence from the largest address side. In the second mode, as indicated in FIGS. 19 and 20, the reference-current instruction values and the current instruction values are transmitted in sequence from the largest address side. In the first mode, the count of the generated current instruction clock signal $CLK_2$ is 2560, while in the second mode, the count of the generated current instruction clock signal $CLK_2$ is 2600. Also, in the first mode, the component of the clock signal $CLK_2$ not used for transmitting reference-current instruction values is used for transmitting null data.

In this manner, the print quality can be improved in correspondence with the characteristics variations of the light-emitting element $LD_1$–$LD_{2560}$.

In addition, even in the case where high resolution type LED heads are installed in order to further improve resolution, by increasing the capacity of the non-volatile memory 37 and the count of the current instruction clock signal $CLK_2$ according to the number of the light-emitting elements, variations in characteristics of the light-emitting elements can also be reduced.

Although the above description referred to examples of LED head wherein the print data signal DATA comprises binary data, the same principles are also applicable to LED heads wherein the print data signal DATA comprises multi-valued data for halftone printing. Except for the above description, the fourth embodiment is the same as the first embodiment.

FIFTH EMBODIMENT

Following is a description of a fifth embodiment of the present invention with reference to the attached drawings.

Figure 22:
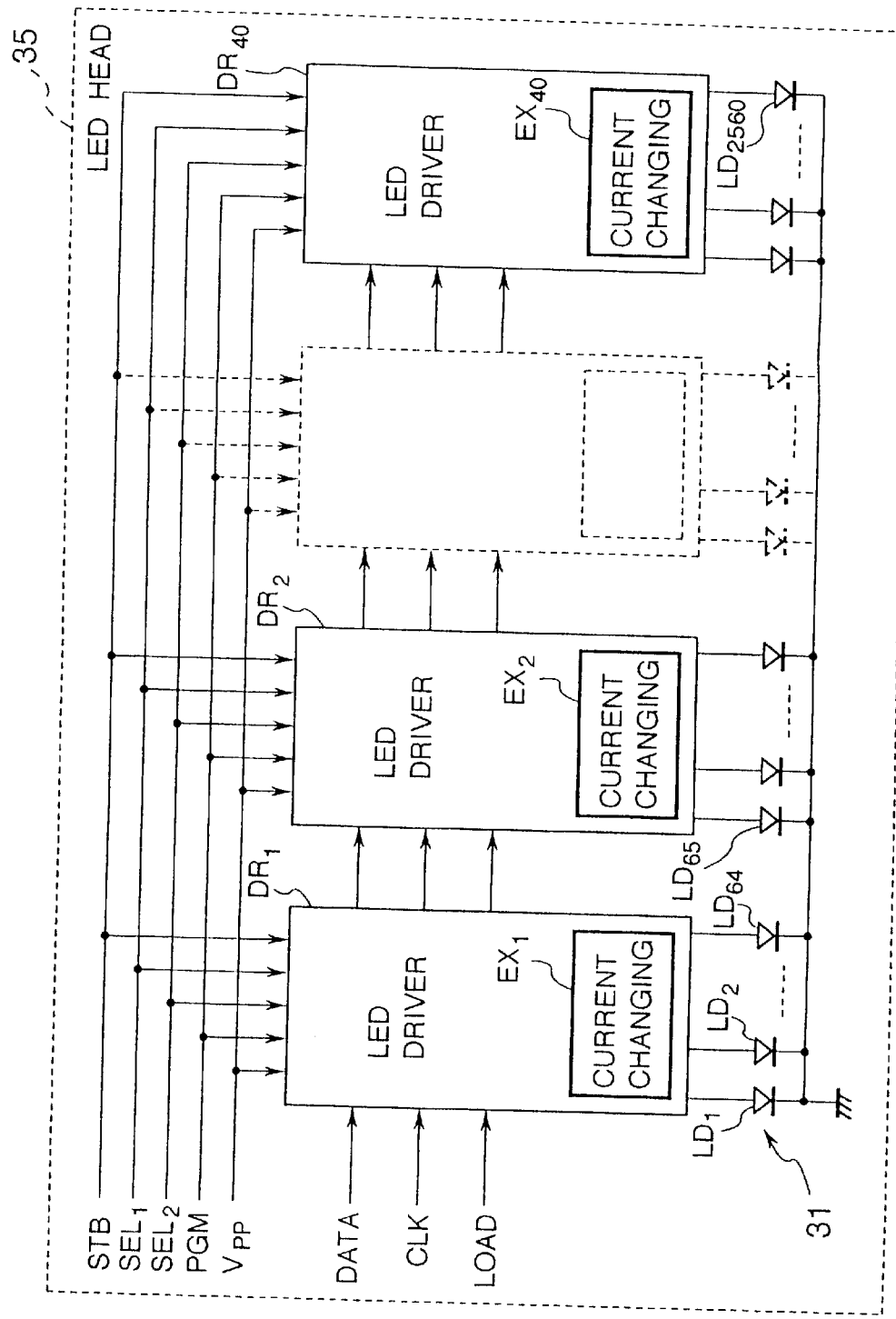
FIG. 22 is a block diagram showing an LED head for non-impact printer according to a fifth embodiment of the present invention.

FIG. 22 is a block diagram showing an LED head 35 for non-impact printer according to the fifth embodiment. As shown in FIG. 22, the LED head 35 comprises LED drivers $DR_1$–$DR_{40}$ and light-emitting elements $LD_1$–$LD_{2560}$. The LED drivers DR1–DR40 each comprise a monolithic semiconductor IC and the LED drivers $DR_1$–$DR_{40}$ perform the on/off control of the drive current which flow into each light-emitting element $LD_1$–$LD_{2560}$. Each monolithic semiconductor LED driver IC LD1–LD2560 includes corresponding current changing circuit EX1–EX40 inside the monolithic IC itself. Such current changing circuits $EX_1$–$FX_{40}$ adjusts the value of the drive current of each light-emitting element $LD_1$–$LD_{2560}$ in a number of steps (16 steps in this embodiment).

Figure 23:
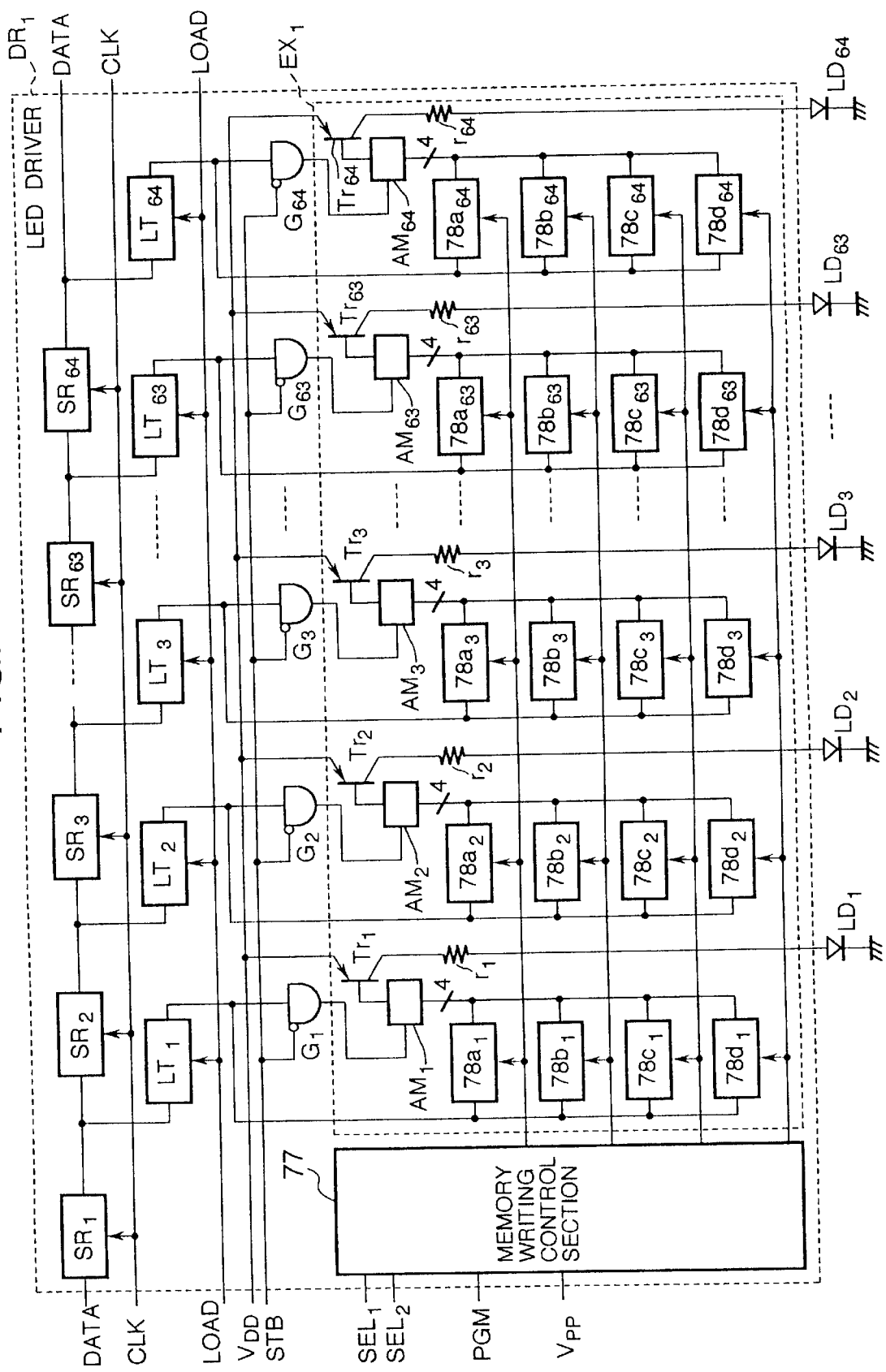
FIG. 23 is a block diagram showing the LED driver of FIG. 22.
Figure 24:
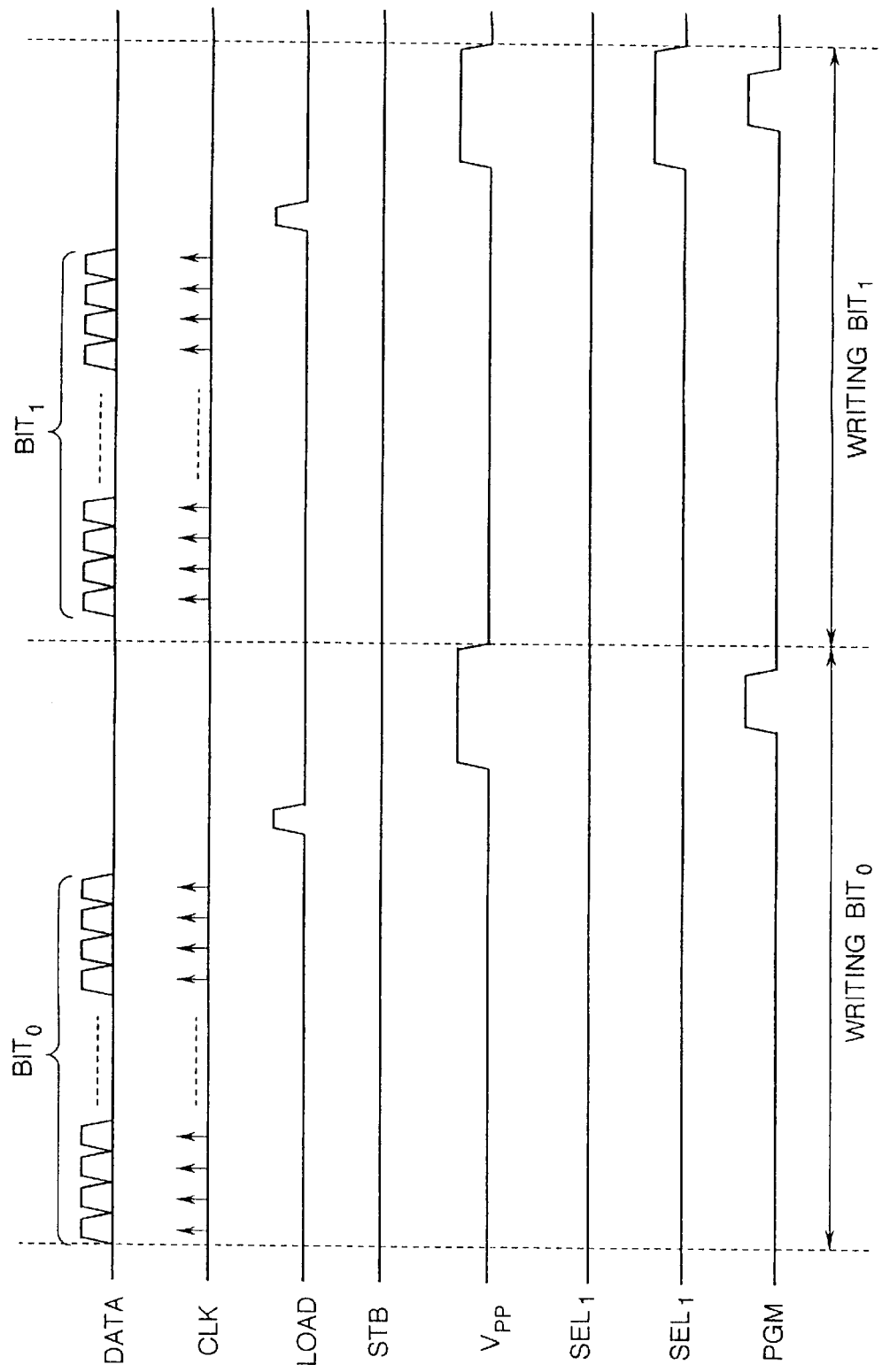
FIG. 24 is a timing chart for the LED driver of FIG. 23.

FIG. 23 is a block diagram showing the LED driver $DR_1$ and FIG. 24 is a timing chart for explaining the operation of the LED driver $DR_1$. As shown in FIG. 23, the LED driver $DR_1$ receives print data signal DATA, clock signal CLK as a synchronization clock, latch signal LOAD for latching the print data signal DATA as serial data, print drive signal STB for producing the light emission instruction output for each light-emitting element $LD_1$–$LD_{64}$, select signals $SEL_1$ and $SEL_2$ for selecting data write memory cells, memory write instruction signal PGM, and memory write power supply input $V_{PP}$. $V_{DD}$ is a power supply input.

The LED driver $DR_1$ comprises shift registers $SR_1$–$SR_{64}$ for sequentially holding the print data signal DATA as serial data, latches $LT_1$–$LT_{64}$ for latching the serial data held in the shift registers $SR_1$–$SR_{64}$, AND gates $G_1$–$G_{64}$ into which the outputs of the latch $LT_1$–$Lt_{64}$ and the print drive signal STB are inputted, and a memory writing control circuit 77 for controlling the memory write. The LED driver $DR_1$ also comprises switching elements $Tr_1$–$Tr_{64}$ for controlling the current in the respective light-emitting elements $LD_1$–$LD_{64}$, non-volatile memories $78a_1$–$78a_{64}$, $78b_1$–$78b_{64}$, $78c_1$–$78c_{64}$, and $78d_1$–$78d_{64}$ for storing current instruction values for adjusting the value of the drive current in the respective light-emitting elements $LD_1$–$LD_{64}$, amplifiers $AM_1$–$AM_{64}$ controlled by the AND gates $G_1$–$G_{64}$ and supplying the current instruction value as a modification data stored in the non-volatile memories $78a_1$–$78a_{64}$, $78b_1$–$78b_{64}$, $78c_1$–$78c_{64}$, and $78d_1$–$78d_{64}$ into the drive current of the switching elements $Tr_1$–$Tr_{64}$, and protective resistors $r_1$–$r_{64}$. The switching elements $Tr_1$–$Tr_{64}$ are controlled by the outputs of the amplifier $AM_1$–$AM_{64}$. It is desirable that the non-volatile memories $78a_1$–$78a_{64}$, $78b_1$–$78b_{64}$, $78c_1$–$78c_{64}$, and $78d_1$–$78d_{64}$ are EEPROMS or other rewritable non-volatile memories.

The current which flows into the respective light-emitting elements $LD_1$–$LD_{64}$ is adjusted by changing the current instruction values stored in the non-volatile memories $78a_1$–$78a_{64}$, $78b_1$–$78b_{64}$, $78c_1$–$78c_{64}$, and $78d_1$–$78d_{64}$.

The serial data of the print data signal DATA are produced in order for the on/off control of the drive current in the respective light-emitting elements $LD_1$–$LD_{64}$, and in order to adjust the drive current in the respective light-emitting elements $LD_1$–$LD_{64}$. The serial data for the on/off control of the drive current in the respective light-emitting elements $LD_1$–$LD_{64}$ are one-bit data, and the serial data for adjusting the value of the drive current in the respective light-emitting elements $LD_1$–$LD_{64}$ are four-bit data.

The four-bit serial data are divided among four cycles for writing into the non-volatile memories $78a_1$–$78a_{64}$, $78d_1$–$78b_{64}$, $78c_1$–$78c_{64}$, and $78d_1$–$78d_{64}$. In other words, of the respective bit data $BIT_0$–$BIT_3$ of the serial data, bit data $BIT_0$ are written into the non-volatile memories $78a_1$–$78a_{64}$, bit data $BIT_1$ are written into the non-volatile memories $78b_1$–$78b_{64}$, bit data $BIT_2$ are written into the non-volatile memories $78c_1$–$78c_{64}$, and bit data $BIT_3$ are written into the non-volatile memories $78d_1$–$78d_{64}$.

Following is a description of the writing operation of bit data $BIT_0$. The bit data $BIT_0$ (which indicates a current instruction value) of the light-emitting element $LD_{2560}$, the bit data $BIT_0$ of the light-emitting element $LD_{2559}$, . . . , the bit data $BIT_0$ of the light-emitting element $LD_2$, and the bit data $BIT_0$ of the light-emitting element $LD_1$ are synchronized to the clock signal CLK and transmitted sequentially as the print data signal DATA to the LED head 35.

When each bit data $BIT_0$ is stored in the shift registers $SR_1$–$SR_{2560}$, at the latch signal LOAD, each bit data $BIT_0$ stored in the shift registers $SR_1$–$SR_{2560}$ is latched in the latches $LT_1$–$LT_{2560}$. In this case, the select signals $SEL_1$ and $SEL_2$ can select the non-volatile memories $78a_1$–$78a_{64}$, $78b_1$–$78b_{64}$, $78c_1$–$78c_{64}$, and $78d_1$–$78d_{64}$. In other words, when $SEL_1=0$ and $SEL_2=0$, the non-volatile memories $78a_1$–$78a_{64}$ are selected; when $SEL_1=1$ and $SEL_2=0$, the non-volatile memories $78b_1$–$78b_{64}$ are selected; when $SEL_1=0$ and $SEL_2=1$, the non-volatile memories $78c_1$–$78c_{64}$ are selected; and when $SEL_1=1$ and $SEL_2=1$, the non-volatile memories $78d_1$–$78d_{64}$ are selected.

When the write voltage of the non-volatile memories $78a_1$–$78a_{64}$, $78b_1$–$78b_{64}$, $78c_1$–$78c_{64}$, and $78d_1$–$78d_{64}$ is applied to the memory write power supply input $V_{pp}$, by inputting a pulse of the write instruction signal PGM to the memory writing control section 77, the bit data $BIT_0$ from the latch $LT_1$–$LT_{2560}$ are written into the non-volatile memories $78a_1$–$78a_{64}$.

By the same operation, the bit data $BIT_1$ can be written into the non-volatile memories $78b_1$–$78b_{64}$; the bit data $BIT_2$ can be written into the non-volatile memories $78c_1$–$78c_{64}$; and the bit data $BIT_3$ can be written into the non-volatile memories $78d_1$–$78d_{64}$.

Following is a description of the printing operation. When the light-emitting elements $LD_1$–$LD_{2560}$ are lighted, the following printing operations are performed by inputting the print drive signal STB. When the print drive signal STB is produced from the AND gates $G_1$–$G_{2560}$, the current control amplifiers $AM_1$–$AM_{2560}$ corresponding to the light-emitting elements $LD_1$–$LD_{2560}$ containing the print data signal DATA are operated.

Also, the bit data $BIT_0$–$BIT_3$ from the non-volatile memory $78a_1$–$78a_{64}$, $78b_1$–$78b_{64}$, $78c_1$–$78c_{64}$, and $78d_1$–$78d_{64}$ storing the current instruction signal are inputted to the amplifiers $AM_1$–$AM_{2560}$. The switching elements $Tr_1$–$Tr_{2560}$ are driven according to the numerical values applied by the bit data $BIT_0$–$BIT_3$ and the value of the drive current in the light-emitting elements $LD_1$–$LD_{2560}$ is adjusted. As a result, the current variations in the lighted light-emitting elements $LD_1$–$LD_{2560}$ are reduced.

A high voltage power supply circuit is required to provide a higher voltage to the current changing circuits $EX_1$–$EX_{40}$ when writing the current instruction values into the non-volatile memories $78a_1$–$78a_{64}$, $78b_1$–$78b_{64}$, $78c_1$–$78c_{64}$, and $78d_1$–$78d_{64}$, than the voltage applied to the current changing circuits $EX_1$–$EX_{40}$ when reading the current instruction values from the non-volatile memories $78a_1$–$78a_{64}$, $78b_1$–$78b_{64}$, $78c_1$–$78c_{64}$, and $78d_1$–$78d_{64}$. Consequently, by writing the current instruction values during manufacturing process of the LED head 35, the need is eliminated for disposing a high voltage circuit in the print control section of the non-impact printer. Except for the above description, the fifth embodiment is the same as the first embodiment.

SIXTH EMBODIMENT

In the above-described first to fifth embodiments, the LED heads include forty LED drivers $DR_1$–$DR_{40}$, each of which is an IC chip and drives sixty four light-emitting elements. Consequently, wire bonding work is required for 2560 lines between the forty monolithic semiconductor IC chips and the respective light-emitting elements $LD_1$–$LD_{2560}$. Also, wire bonding work is required for inputting or outputting signals such as the actual print data signal DATA, clock signal CLK, latch signal LOAD, clock signal $CLK_2$ for current instruction and the four-bit current instruction signal $SG_5$. That is to say, the following number of wire bondings are required for the forty IC chips.

8 (bits)×2 (input/output)×40 (IC chips)=640 (lines).

Consequently, the assembly time for the LED heads becomes long and its cost becomes high. Also, in this case, the wire bonding work for the print drive signal STB is ignored. The object of the sixth embodiment are reducing the wire bonding work, shortening the assembly time of the LED heads, and reducing the cost of the LED head for non-impact printer.

Figure 25:
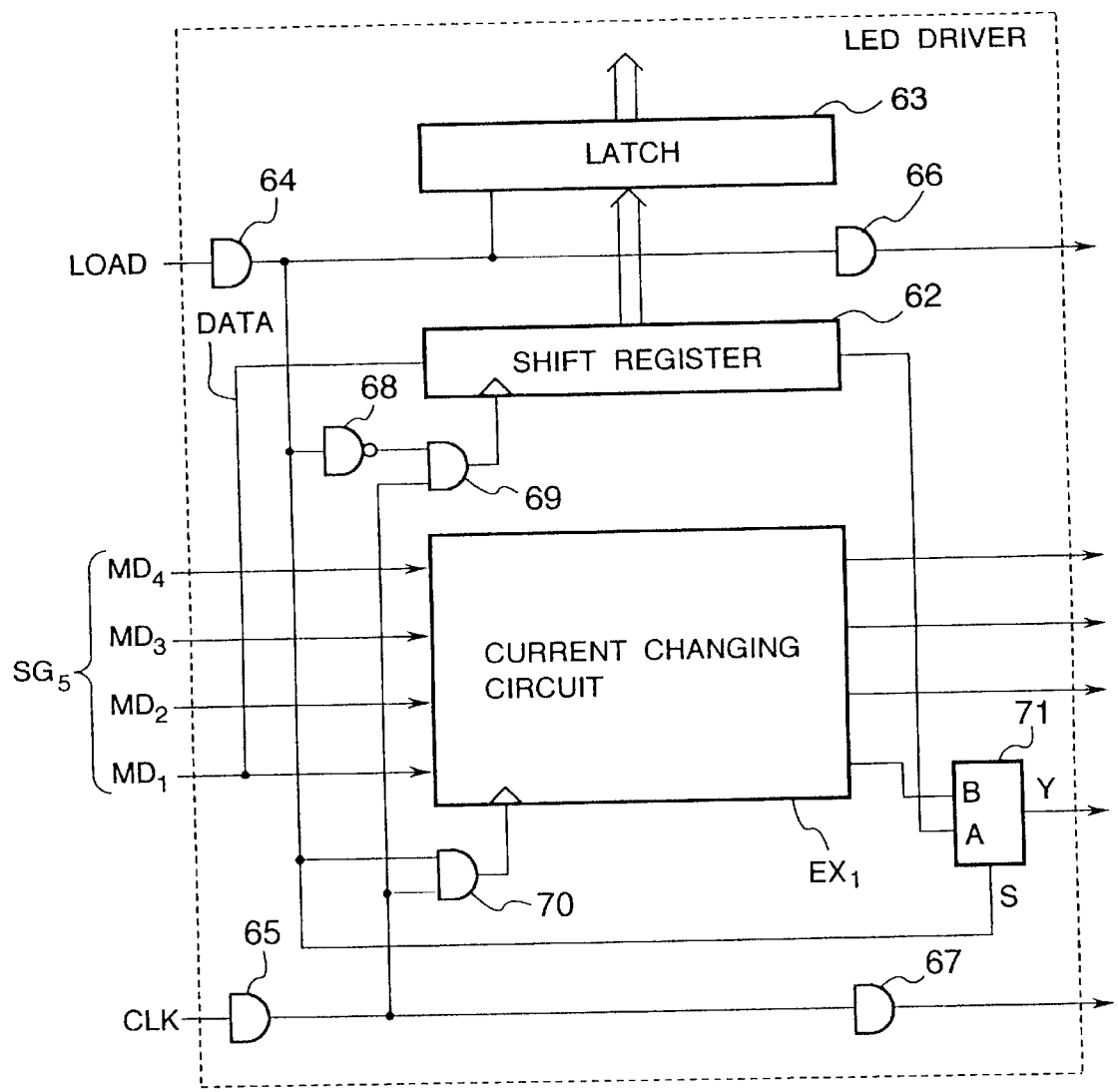
FIG. 25 is a block diagram showing an LED driver of the LED head according to a sixth embodiment of the present invention.
Figure 26:
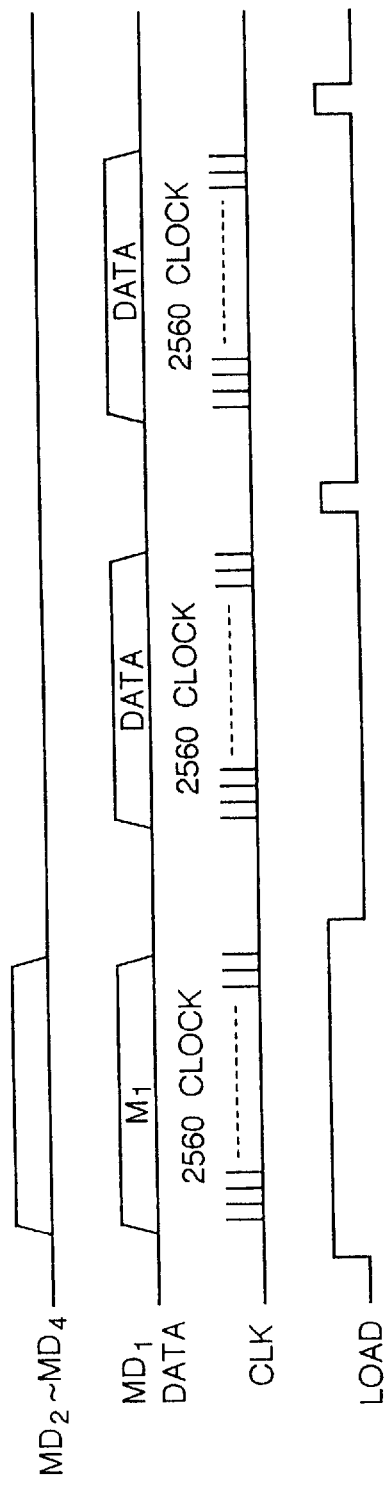
FIG. 26 is a timing chart of the LED driver of FIG. 25.

FIG. 25 is a block diagram showing an LED driver contained in the LED head according to a sixth embodiment of the present invention, and FIG. 26 is a timing chart of the LED driver of FIG. 25. In FIG. 25, $EX_1$ is a current changing circuit comprising sixty four four-bit shift registers for transmitting current instruction signals $SG_5$ which instruct the values of the drive current of the light-emitting elements. In FIG. 25, a numeral 62 is a shift register circuit for transferring bit data of the actual print data signal DATA, a numeral 63 is a latch circuit for latching the bit data of the shift register circuit 62, numerals 64 and 65 are input buffer circuits, and numerals 66 and 67 are output buffer circuits. Also, a numeral 68 is an inverter circuit, numerals 69 and 70 are AND circuits, and a numeral 71 is a multiplexer circuit.

When in the multiplexer circuit 71, the input terminal S is low level, the data of the input terminal A are outputted from the output terminal Y, and when the input, terminal S is high level, the data of the input terminal B data are outputted from the output terminal Y.

When the output data from the output terminal Y are sent as the current instruction signal $SG_5$ to the current changing circuit $EX_1$, the printing control section sets the latch signal LOAD to high level. In this state, when the clock signal CLK is outputted, since the output of the inverter circuit 68 goes to low level, the output of the AND circuit 69 remains at low level and the input of the clock signal CLK is not supplied to the shift register circuit 62.

However, the clock signal CLK remains in the output of the AND circuit 70, the bit data $MD_1$–$MD_4$ of the current instruction signal $SG_5$ are inputted to the current changing circuit $EX_1$ in synchronization with the clock signal CLK and then the current instruction values are set in the current changing circuit $EX_1$.

At this time, since the input terminal S of the multiplexer circuit 71 is high level, the bit data $MD_1$ are outputted from the output terminal Y.

At completion of transmission of the current instruction signal $SG_5$, the printing control section sets the latch signal LOAD to low level and the actual print data signal DATA is transmitted in synchronization with the clock signal CLK. In this case, the actual print data signal DATA is transmitted using the signal line for transmitting the bit data $MD_1$.

Since the latch signal LOAD is low level at this time, the output of the AND circuit 70 remains at low level and the input of the clock signal CLK is not supplied to the current changing circuit $EX_1$. However, the clock signal CLK is outputted from the AND circuit 69, and the actual print data signal DATA is transmitted.

Since the input terminal S of the multiplexer circuit 71 then goes to low level, the print data signal DATA is outputted from the output terminal Y.

In this case, the signal lines for transmitting the print data signal DATA and the signal lines for transmitting the current instruction signal $SG_5$ are used in common. Also, since the clock signal CLK is used as the current instruction clock signal $CLK_2$, input/output of the print data signal DATA, clock signal CLK, latch signal LOAD and four-bit current instruction signal STB requires wire bonding work per IC chip amounting to only 6 (bits)×2 (input/output)×40 (IC chips)=480 (lines)

Consequently, since 640−480=160 (lines) of wire bonding work can be made unnecessary, the assembly time for the LED head can be shortened and its cost reduced. Except for the above description, the fifth embodiment is the same as the first embodiment.

The foregoing descriptions referred to examples of the LED heads wherein the print data signal DATA is binary data. However, the LED heads can also be used wherein the print data signal DATA is multi-valued data for halftone printing.

The above described first to sixth embodiments referred to examples wherein current instruction values were used for adjusting the drive current in the respective light-emitting elements $LD_1$–$LD_{2560}$. However, the electrical energy, such as voltage, applied to the respective light-emitting elements $LD_1$–$LD_{2560}$ can also be adjusted.

The present invention is not limited by the above-described embodiments and numerous variations are possible within the scope of the present invention, and such variations do not restrict the scope of the present invention.

Also, the above descriptions are also applicable to the dot-type print head such as a plasma display panel head and thermal head.

What is claimed is:

1. A print head comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation;

a transmitter for transmitting each modification data stored in the memory to the corresponding driver having the function of changing drive energy prior to the printing operation; and a mode controller for switching between a printing mode in which said printing operation is conducted and a transmission mode in which each modification data stored in said memory is transmitted to the corresponding driver.

2. A print head comprising a plurality of IC chips, each IC chip having:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation; and a transmitter for transmitting each modification data stored in the memory to the corresponding driver having the function of changing drive energy prior to the printing operation;

wherein each driver comprises a reference-energy changer for supplying a reference energy to the corresponding driver;

each of said IC chips further having an energy changer to which modification data for said energy changer is supplied and which adjusts the reference energy supplied to said drivers, so that said energy changer adjusts the reference energy of the respective IC chip; and said reference energy being adjusted on the basis of the corresponding modification data transmitted from said memory.

3. A print head comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation;

a transmitter for transmitting each modification data stored in the memory to the corresponding driver having the function of changing drive energy prior to the printing operation; and a memory writing controller, wherein each driver comprises a shift register for storing said print datum or said modification data, and a latch for latching said print datum stored in said shift register; and wherein each driver comprises a multiple shift registers for storing said modification data transmitted from the corresponding latch according to an instruction from said memory writing controller, and a first circuit for changing said drive energy of the corresponding printing element based on the modification data stored in said multiple shift registers;

said modification data inputted to said multiple shift registers being one-bit data, an energy instruction signal outputted from said multiple shift registers being multi-bit data.

4. A print head comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation;

a transmitter for transmitting each modification data stored in the memory to the corresponding driver having the function of changing drive energy prior to the printing operation; and wherein a plurality of the drivers and the memory are composed within a single IC chip;

wherein each driver comprises a print datum storage section for storing said print datum inputted through a first data line;

wherein said memory stores said modification data inputted through a second data line; and wherein said IC chip further comprises a common external terminal coupled to both said first and second data lines, and a switching section for selecting either said common external terminal or said second data line.

5. A non-impact printer comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation;

a transmitter for transmitting each modification data stored in the memory to the corresponding driver having the function of changing drive energy prior to the printing operation; and a mode controller for switching between a printing mode in which said printing operation is conducted and a transmission mode in which each modification data stored in said memory is transmitted to the corresponding driver.

6. A non-impact printer comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation;

a transmitter for transmitting each modification data stored in the memory to the corresponding driver having the function of changing drive energy prior to the printing operation; and a memory writing controller, wherein each driver comprises a shift register for storing said print datum or said modification data, and a latch for latching said print datum stored in said shift register; and wherein each driver comprises a multiple shift registers for storing said modification data transmitted from the corresponding latch according to an instruction from said memory writing controller, and a first circuit for changing said drive energy of the corresponding printing element based on the modification data stored in said multiple shift registers;

said modification data inputted to said multiple shift registers being one-bit data, an energy instruction signal outputted from said multiple shift registers being multi-bit data.

7. A print head comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a non-volatile memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation;

a transmitter for transmitting each modification data stored in the memory to the corresponding driver having the function of changing drive energy prior to the printing operation; and wherein the memory and the transmitter are provided within a first IC chip, and the driver is provided within a second IC chip different from the first IC chip.

8. A print head comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation; and a transmitter for transmitting each modification data stored in the memory to the corresponding driver having the function of changing drive energy prior to the printing operation;

wherein the transmitter is composed so as to transmit a predetermined number of transmission data, the predetermined number being equal to or more than a number of the data stored in the memory regardless of the number of the data stored in the memory;

if the number of data stored in the memory is less than the predetermined number of transmission data, the data is stored in the memory so as to be transmitted with a delay corresponding to a difference between the predetermined number of transmission data and the number of the data stored in the memory, thereby setting the data stored in the memory in the driver at a same time as completing transmitting the predetermined number of transmission data.

9. A non-impact printer comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a non-volatile memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation; and a transmitter for transmitting each modification data stored in the memory to the corresponding driver having the function of changing drive energy prior to the printing operation;

wherein the memory and the transmitter are provided within a same IC chip, and the drivers are provided within another IC chip.

10. A non-impact printer comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation; and a transmitter for transmitting each modification data stored in the memory to the corresponding driver having the function of changing drive energy prior to the printing operation;

wherein the transmitter is composed so as to transmit a predetermined number of transmission data, the predetermined number being equal to or more than a number of the data stored in the memory regardless of the number of the data stored in the memory;

if the predetermined number is less than the number of data stored in the memory, the data is stored in the memory so as to be transmitted with a delay corresponding to a difference between the predetermined number or transmission data and the number of the data stored in the memory, thereby setting the data stored in the memory in the driver after completing transmitting the predetermined number of transmission data.

11. A print head comprising:

a plurality of light emitting printing elements, each printing element having an input;

a plurality of drivers, each driver having a function of changing drive energy, each driver being coupled to the input of a corresponding printing element, each driver having an input for receiving a print datum thereat and an input for receiving modification data thereat, each driver generating the drive energy if the print datum has a logic for printing and causing the drive energy to flow into the respective printing element, a value of each drive energy being determined based on the received corresponding modification data;

a memory having a plurality of modification data stored therein, each modification data being previously determined based on a measured output intensity of the corresponding printing element when such corresponding printing element is driven by the corresponding driver such that each energy is emitted through an optical system from each printing element at a substantially uniform intensity at the printing operation; and a transmitter for transmitting each modification data stored in the memory to the corresponding driver having the function of changing drive energy prior to the printing operation;

wherein the plurality of drivers are divided into groups including a predetermined number of the drivers, and each group is provided within a single IC chip, the IC chip further comprising an energy changer which adjusts an output energy of the IC chip on the basis of the modification data corresponding to the energy changer supplied from the memory.

\* \* \* \* \*